United States Patent
Nagata et al.

(10) Patent No.: US 8,290,105 B2
(45) Date of Patent: Oct. 16, 2012

(54) SIGNAL RECEPTION DEVICE AND METHOD OF SIGNAL RECEPTION TIMING DETECTION

(75) Inventors: Satoshi Nagata, Yokohama (JP);
Noriyuki Maeda, Yokohama (JP);
Hiroyuki Atarashi, Yokohama (JP);
Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 812 days.

(21) Appl. No.: 10/986,003

(22) Filed: Nov. 12, 2004

(65) Prior Publication Data

US 2005/0100109 A1    May 12, 2005

(30) Foreign Application Priority Data

Nov. 11, 2003  (JP) .................. 2003-381600

(51) Int. Cl.
*H04L 7/00* (2006.01)
*H04L 7/02* (2006.01)

(52) U.S. Cl. ........ 375/360; 375/260; 375/354; 375/355; 327/141; 327/185; 327/231; 327/261; 370/503; 370/509; 370/512; 370/514

(58) Field of Classification Search .................. 375/260, 375/362
See application file for complete search history.

(56) References Cited

U.S. PATENT DOCUMENTS

| | | | |
|---|---|---|---|
| 5,848,107 A | | 12/1998 | Philips |
| 6,160,821 A | * | 12/2000 | Dolle et al. .................. 370/509 |
| 6,304,624 B1 | * | 10/2001 | Seki et al. .................. 375/365 |
| 6,434,205 B1 | | 8/2002 | Taura et al. |
| 6,456,653 B1 | * | 9/2002 | Sayeed .................. 375/227 |
| 6,512,720 B1 | * | 1/2003 | Yang .................. 367/134 |
| 6,658,063 B1 | * | 12/2003 | Mizoguchi et al. .......... 375/260 |
| 6,711,123 B1 | * | 3/2004 | Taira .................. 370/208 |
| 6,993,083 B1 | * | 1/2006 | Shirakata et al. .......... 375/260 |
| 7,177,376 B2 | * | 2/2007 | Atungsiri et al. .......... 375/343 |
| 2003/0016773 A1 | * | 1/2003 | Atungsiri et al. .......... 375/343 |
| 2003/0043733 A1 | * | 3/2003 | Maeda et al. .......... 370/210 |
| 2003/0210670 A1 | * | 11/2003 | Kisigami et al. .......... 370/335 |

(Continued)

FOREIGN PATENT DOCUMENTS

EP    1063824 A2    12/2000

(Continued)

OTHER PUBLICATIONS

Nathan Yee, et al., "Multi-carrier CDMA in Indoor Wireless Radio Networks", IEEE Personal and Indoor Mobile Radio Communication, 1993, pp. 109-113.

(Continued)

*Primary Examiner* — Shuwang Liu
*Assistant Examiner* — Gina McKie
(74) *Attorney, Agent, or Firm* — Oblon, Spivak, McClelland, Maier & Neustadt, L.L.P.

(57) ABSTRACT

A signal reception device is disclosed that is capable of detecting symbol synchronization timing with high precision in accordance with a condition of a propagation path even in an environment involving multi-path interference. The signal reception device adopts an OFCDM transmission scheme or a multi-carrier transmission scheme. The signal reception device includes a received signal information calculation unit to calculate received signal information representing a signal reception condition of a received signal; an output combination unit to combine correlation values in a predetermined section obtained by correlation detection based on the received signal information; and a symbol timing detection unit to detect a symbol synchronization timing based on the combined value.

2 Claims, 26 Drawing Sheets

U.S. PATENT DOCUMENTS

| | | | | |
|---|---|---|---|---|
| 2004/0004933 A1* | 1/2004 | Zhu et al. | ............... | 370/203 |
| 2004/0141570 A1* | 7/2004 | Yamazaki et al. | ............... | 375/340 |
| 2004/0223449 A1* | 11/2004 | Tsuie et al. | ............... | 370/204 |
| 2004/0228272 A1* | 11/2004 | Hasegawa et al. | ............... | 370/210 |
| 2006/0039453 A1* | 2/2006 | Yamada | ............... | 375/150 |
| 2006/0165197 A1* | 7/2006 | Morita et al. | ............... | 375/326 |

FOREIGN PATENT DOCUMENTS

| | | |
|---|---|---|
| JP | 10-126288 | 5/1998 |
| JP | 10-507616 | 7/1998 |
| JP | 2001-69119 | 3/2001 |
| JP | 2001-257631 | 9/2001 |
| JP | 2003-152681 | 5/2003 |
| KR | 1998-047269 | 9/1998 |
| KR | 2001-0001707 | 1/2001 |
| WO | WO 03071724 A1 * | 8/2003 |

OTHER PUBLICATIONS

Jan-Jaap Van de Beek, et al., "ML Estimation of Time and Frequency Offset in OFDM Systems", IEEE Transactions on Signal Processing, vol. 45, No. 7, Jul. 1997, pp. 1800-1805.

Minoru Okada, et al., "A Maximum Likelihood Symbol Timing and Frequency Offset Estimator for Orthogonal Multi-Carrier Modulation Signals", The Institute of Electronics, Information and Communication Engineers Technical Report of IEICE, RCS95-118, Jan. 1996, pp. 45-50.

Takeshi Onizawa, et al., "A Fast Synchronization Scheme of OFDM Signals for High-Rate Wireless LAN", IEICE Transactions on Communication, vol. E82-B, No. 2, Feb. 1999, pp. 455-463.

Akinori Taira, et al., "A Timing Synchronization Scheme for OFDM in Frequency Selective Fading Environment", IEICE Transactions on Communication, B vol. J84-B, No. 7, Jul. 2001, pp. 1255-1264.

* cited by examiner

SIGNAL RECEPTION DEVICE AND METHOD OF SIGNAL RECEPTION TIMING DETECTION

BACKGROUND OF THE INVENTION

1. Field of the Invention

The present invention generally relates to a signal reception device and a method of detecting a timing of signal reception in a mobile communication system, and in particular, to a signal reception device and a method of signal reception timing detection employing an OFCDM (Orthogonal Frequency and Code Division Multiplexing) transmission scheme or a multi-carrier transmission scheme.

2. Description of the Related Art

At the present time, study is being made of radio transmission schemes for the fourth generation mobile communication system aiming at higher speed and larger capacity than the third generation mobile communication system (W-CDMA). For example, a multi-carrier CDMA (Code Division Multiple Access) scheme, which involves multiplication of spread codes in a frequency axis, has tolerance for frequency-selectivity of propagation paths arising from existence of multiple paths, which causes a problem in conventional mobile communications. Due to this tolerance, it is positively studied to apply the multi-carrier CDMA scheme to radio transmission in the fourth generation mobile communication systems. For example, reference can be made to "Multi-carrier CDMA in indoor wireless radio networks," N. Yee et al., 1993, IEEE Personal and Indoor Mobile Radio Communication (Below, referred to as "reference 1").

The so-called OFCDM radio transmission scheme is based on the multi-carrier CDMA radio transmission scheme, in which information symbols are duplicated along a time axis and a frequency axis, and after each of the symbols is multiplied with one chip of a spread code, the thus obtained spread signals are transmitted in parallel by OFCDM symbols at different times and a number of sub-carriers having different frequencies. Because multiplication of the spread codes is performed in the time axis and frequency axis in OFCDM, and by multiplying orthogonal spread codes, codes of multiple information channels can be multiplexed.

By parallel signal transmission using a number of sub-carriers, the symbol rate is made low and the symbol length is made long. Due to this, it is possible to suppress influence of so-called "multi-path interference", that is, the interference between signals arriving at a signal receiver at different timings after propagating through a number of different paths (multi-path propagation paths). The multi-path interference causes degradation of signal performance, and is a problem in the mobile communication environment.

In the header of each OFCDM symbol, a redundant portion referred to as "guard interval" is provided, which corresponds to repeated transmission of the latter portion of the symbol. By the guard interval, it is possible to suppress influence of inter-symbol interference arising from the aforementioned multi-path propagation.

In the multiple propagation paths, change of a propagation path is dependent on the frequency, in other words, frequency-selectivity fading occurs, and signal transmission quality changes with the frequency. In OFCDM, however, because signals are spread in the frequency axis, the signal transmission quality can be improved due to a frequency diversity effect.

On the other hand, by applying OFCDM received signals on FFT (Fast Fourier Transform), information symbols related to each sub-carrier are restored. Then, codes the same as the spread codes multiplied at the transmitting end are multiplied in the time axis and the frequency axis, and the received signals related to each sub-carrier are combined over a period of the spread codes for de-spreading.

FIGS. 25A and 25B are schematic views exemplifying the starting position of the received signals applied to FFT, also referred to as "symbol synchronization timing".

As shown in FIG. 25A, the symbol synchronization timing of the received signals applied to FFT is ideally set at the end of the guard interval, that is, at the header (1) of an information symbol section of an OFCDM signal. In doing so, in the section (2) of a signal applied to FFT, also referred to as "FFT window section", the incoming signals of each delay wave (here, delay waves 1 and 2) can be extracted without inter-symbol interference.

However, as shown in FIG. 25B, when the detected symbol synchronization timing deviates from the ideal position because of influence of the propagation paths, the inter-symbol interference occurs in the FFT window section, components of adjacent OFCDM signals are extracted simultaneously, and transmission performance degrades because of the inter-symbol interference. For this reason, it is important to appropriately estimate the symbol synchronization timing.

A method of detecting the symbol synchronization timing has been proposed in the related art. Similar to the OFCDM transmission, in the multi-carrier transmission of the related art involving transmission of information symbols using a number of sub-carriers having different frequencies, because the guard interval is just repeating transmission of the latter portion of the multi-carrier transmission signal, the symbol synchronization timing can be detected by using auto-correlation of the repeated portion. For example, reference can be made to "ML estimation of time and frequency offset in OFDM system", J.- J. v. de Beek, M. Sandell, P. O. Brjesson, IEEE Trans. Signal Proc., vol. 45, no. 7, pp. 1800-1805, July 1997 (below, referred to as "reference 2"), and "Estimation of maximum likelihood symbol timing and frequency offset of multi-carrier modulated signals", Okada, Hara, Komaki, and Morinaga, Technical report of IEICE (The Institute of Electronics Information and Communication Engineers), RCS95-118, pp 45-50, January 1996 (below, referred to as "reference 3").

Another method is disclosed in "A fast synchronization scheme of OFDM signals for high-rate wireless LAN", T. Onizawa et al., IEICE Transactions on Communications, vol. E82-B, no. 2, pp. 455-463, February 1999 (below, referred to as "reference 4"). Specifically, repeated signals are inserted in the header of the information signal section, and the symbol synchronization timing is detected by using auto-correlation of the received signals measured at this repeated portion.

Still another method is disclosed in "Timing synchronization in an OFDM communication system under Frequency Selective Fading", Hira, Ishitsu, Miake, IEICE Transactions on Communications, B Vol. J84-B No. 7 pp. 1255-1264, July, 2001 (below, referred to as "reference 5"). Specifically, after calculating correlation between known pilot signals and received signals at a receiving end, among a series of the obtained correlation values, a position related to a maximum correlation value is extracted, the correlation values prior to the position are searched for, and a position related to the most forward correlation value exceeding a preset threshold is detected. The timing corresponding to this position is used as the symbol synchronization timing.

Japanese Laid Open Patent Application No. 2003-152681 (below, referred to as "reference 6") discloses a technique capable of detecting spread codes quickly and precisely at the signal receiving end. Specifically, in a mobile communication system using the multi-carrier CDMA, on the side of the mobile station, a number of base stations are selected as the candidates of the most appropriate cell, and the correlation of each of the base stations is calculated, thereby detecting the FFT timing of the most appropriate cells and detecting scramble codes.

However, when applying the OFCDM transmission scheme to a mobile communication environment, because of the multi-path interference, it is difficult to detect the ideal symbol synchronization timing. In the technique disclosed in the aforementioned reference 2, the influence of the multi-path interference is not taken into consideration.

In the methods of the related art, including that disclosed in the reference 3, involving detecting the symbol synchronization timing by using the auto-correlation of the repeated portion, because the correlation value series is gently-sloping, the detected timing involves a large uncertainty, and when a delay wave having high electric power is incident, the synchronization timing (position) shifts backward. Especially, in a propagation path having a large delay spread, interference with the previous symbol and the next symbol occurs, hence the auto-correlation characteristic declines greatly.

In the technique disclosed in the reference 4, in order to detect the maximum output of the auto-correlation of the received signals and to reduce the influence of the multi-path interference, a timing early by a certain value is detected as the symbol synchronization timing. In this method, however, depending on the propagation path, it is necessary to optimize the value of the timing shifted forward, and it is difficult to flexibly respond to a frequently changing propagation path condition.

In the technique disclosed in the reference 5, because the correlation values prior to the position related to the maximum correlation value are searched for a correlation value exceeding a correlation value larger than 1/a of the maximum correlation value, when a delay wave having a long delay time and high electric power is present, the reception power after FFT cannot reach a maximum, and the inter-symbol interference becomes strong. In addition, because the most appropriate threshold value changes greatly depending on a transmission path model, it is necessary to optimize the threshold value, and thus it is difficult to flexibly respond to the frequently changing propagation path condition.

The technique disclosed in the reference 6 is capable of detecting the FFT timing of the most appropriate cell by selecting a number of base stations as the candidates of the most appropriate cell. However, in this technique, the FFT timing is obtained from a timing related to a maximum of detected correlation values between received signals including all the sub-carrier components before FFT and a replica of a synchronization signal, but not by combining the correlation values while requiring the correlation value after FFT to become the maximum. Therefore, it is difficult for this technique to detect the symbol synchronization timing precisely in response to the condition of the propagation path.

SUMMARY OF THE INVENTION

Accordingly, it is a general object of the present invention to solve one or more problems of the related art.

A more specific object of the present invention is to provide a signal reception device and a method of signal reception timing detection capable of detecting symbol synchronization timing with high precision in accordance with a condition of a propagation path even in an environment involving multi-path interference.

According to a first aspect of the present invention, there is provided a signal reception device adopting an OFCDM (Orthogonal Frequency and Code Division Multiplexing) transmission scheme or a multi-carrier transmission scheme. The signal reception device includes a received signal information calculation unit configured to calculate received signal information representing a signal reception condition of a received signal; an output combination unit configured to combine correlation values in a predetermined section obtained by correlation detection based on the received signal information; and a symbol timing detection unit configured to detect a symbol synchronization timing based on the combined value.

As an embodiment, the symbol timing detection unit detects the symbol synchronization timing by using the combined value obtained by the output combination unit so that electric power of a received signal after FFT or a ratio of electric power of a received signal after FFT (Fast Fourier Transform) to interference power becomes a maximum.

As an embodiment, the received signal information calculation unit calculates a correlation value between known pilot signals as the received signal information.

As an embodiment, the received signal information calculation unit calculates an auto-correlation value of the received signal as the received signal information.

As an embodiment, the received signal information calculation unit calculates an estimation of a propagation path change obtained based on known pilot signals transmitted from a transmitting end as the received signal information.

As an embodiment, the signal reception device further includes a replica signal generation unit configured to generate replica signals of a desired signal and an interference signal, respectively, based on calculation results of the received signal information calculation unit. The output combination unit combines the replica signals in a predetermined section; and the symbol timing detection unit detects the symbol synchronization timing using the combined replica signals.

For example, the output combination unit uses reception timings of a plurality of delay waves in the received signal as candidates of the symbol synchronization timing, and combines the replica signals in predetermined sections related to the timing candidates, respectively; and the symbol timing detection unit selects one of the timing candidates resulting in a maximum of the combined replica signal as the symbol synchronization timing.

Alternatively, the output combination unit uses reception timings of a plurality of delay waves in the received signal each shifted by a predetermined value as candidates of the symbol synchronization timing, and combines the replica signals in predetermined sections related to the timing candidates, respectively; and the symbol timing detection unit selects one of the timing candidates resulting in a maximum of the combined replica signal as the symbol synchronization timing.

Alternatively, the output combination unit uses reception timings and reception timings each shifted by a predetermined value of a plurality of delay waves in the received signal as candidates of the symbol synchronization timing, and combines the replica signals in predetermined sections related to the timing candidates, respectively; and the symbol timing detection unit selects one of the timing candidates resulting in a maximum of the combined replica signal as the symbol synchronization timing.

As an embodiment, the symbol timing detection unit includes an SIR estimation unit configured to estimate a ratio of electric power of a received signal after FFT (Fast Fourier Transform) to interference power by using the combined replica signals; and the symbol timing detection unit detects the symbol synchronization timing based on results of the estimation.

According to a second aspect of the present invention, there is provided a method of detecting a timing of a received signal in a signal reception device adopting an OFCDM (Orthogonal Frequency and Code Division Multiplexing) transmission scheme or a multi-carrier transmission scheme. The method includes the steps of calculating received signal information representing a signal reception condition of a received signal; combining correlation values in a predetermined section obtained by correlation detection based on the received signal information; and detecting a symbol synchronization timing based on the combined value.

According to the present invention, in the OFCDM transmission scheme or a multi-carrier transmission scheme, it is possible to detect an appropriate symbol synchronization timing according to a condition of a propagation path even when the multi-path interference exists, and to reduce the inter-symbol interference accompanying a timing deviation. Consequently, it is possible to improve the signal transmission performance.

These and other objects, features, and advantages of the present invention will become more apparent from the following detailed description of the preferred embodiments given with reference to the accompanying drawings.

DESCRIPTION OF THE PREFERRED EMBODIMENTS

Below, preferred embodiments of the present invention are explained with reference to the accompanying drawings.

Figure 1:
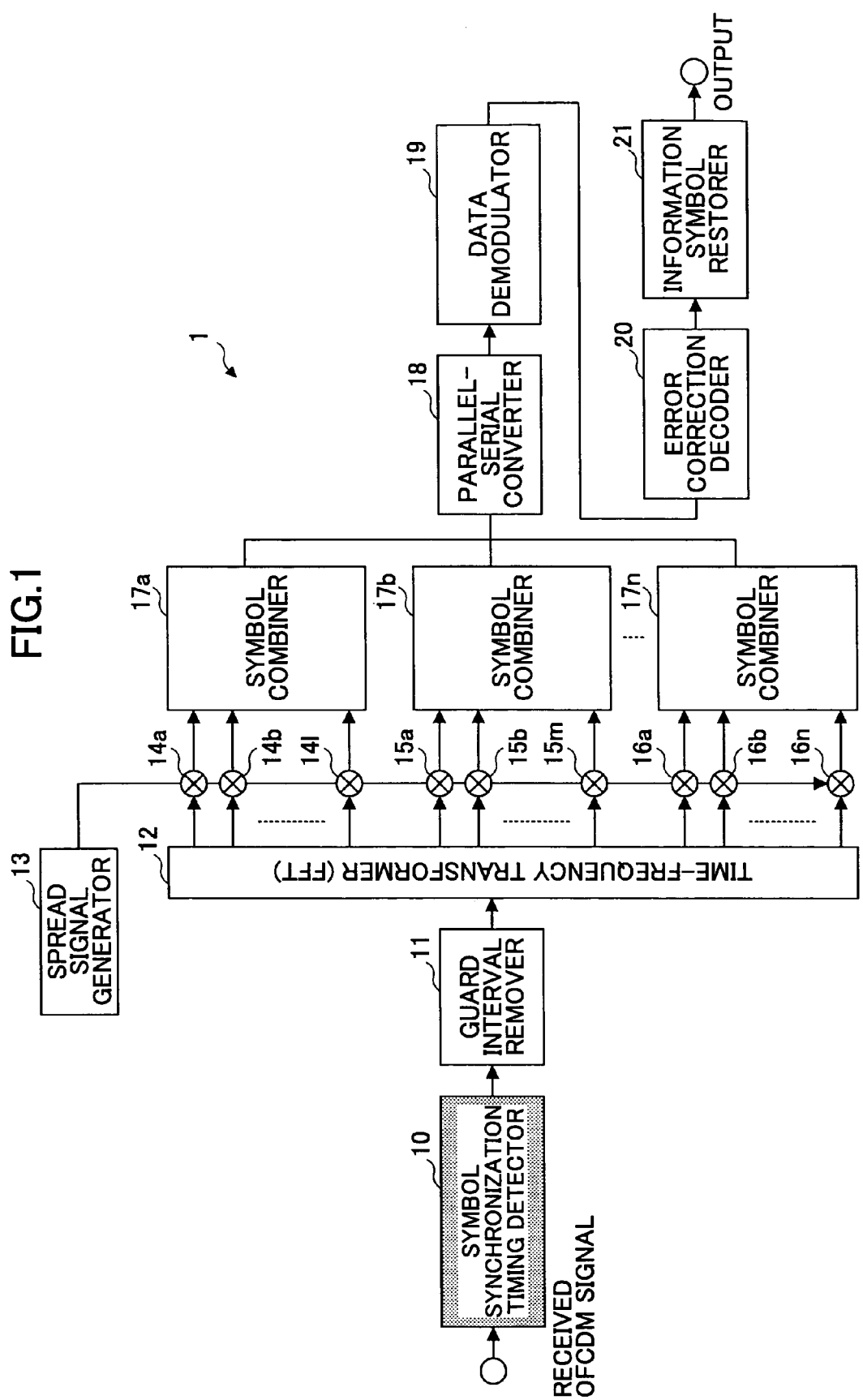
FIG. 1 is a block diagram showing a configuration of an OFCDM signal reception device according to an embodiment of the present invention.

FIG. 1 is a block diagram showing a configuration of an OFCDM signal reception device, which adopts an OFCDM (Orthogonal Frequency and Code Division Multiplexing) transmission scheme, according to an embodiment of the present invention.

In the OFCDM transmission scheme, information symbols are duplicated and arranged in a time axis and a frequency axis; each of the duplicated information symbols is multiplied with a spread code in the time axis and frequency axis, and the thus obtained spread signals are transmitted by a number of symbols at different times and a number of sub-carriers having different frequencies.

The OFCDM transmission scheme is a typical multiplexing method employing a number of carriers in the down-link channel in a mobile communication system.

In FIG. 1, the OFCDM signal reception device 1 includes a symbol synchronization timing detection unit 10, a guard interval removing unit 11, a time-frequency transformation unit (FFT) 12, a spread signal generation unit 13, multiplication units 14a, 14b, . . . 141, 15a, 15b, . . . 15m, 16a, 16b, 16n, symbol combination units 17a, 17b, . . . 17n, a parallel-serial conversion unit 18, a data demodulation unit 19, an error correction decoding unit 20, and an information symbol restoration unit 21.

In the present embodiment, once a received OFCDM signal is input to the symbol synchronization timing detection unit 10, the symbol synchronization timing detection unit 10 detects the symbol synchronization timing. Then, the guard interval removing unit 11 removes a guard interval and the time-frequency transformation unit (FFT) 12 divides the received OFCDM signal into components corresponding to frequencies of sub-carriers. Then, the multiplication units 14a, 14b, . . . 141, 15a, 15b, . . . 15m, and 16a, 16b, . . . 16n spread, in the time axis and frequency axis, the signal components related to the sub-carriers by spread codes which correspond to individual information channels and are generated in the spread signal generation unit 13. The spread signals are input to the symbol combination units 17a, 17b, . . . 17n, where symbols are combined over the spreading period, thereby restoring un-spread signals. The parallel-serial conversion unit 18 converts the thus restored signals from parallel signals to serial signals, and the data demodulation unit 19 demodulates the input signals, the error correction decoding unit 20 corrects errors and decodes the input signals, and the information symbol restoration unit 21 restores information signals transmitted from the transmitting end.

Next, explanations are made of the symbol synchronization timing detection unit 10 illustrated in FIG. 1.

Figure 2:
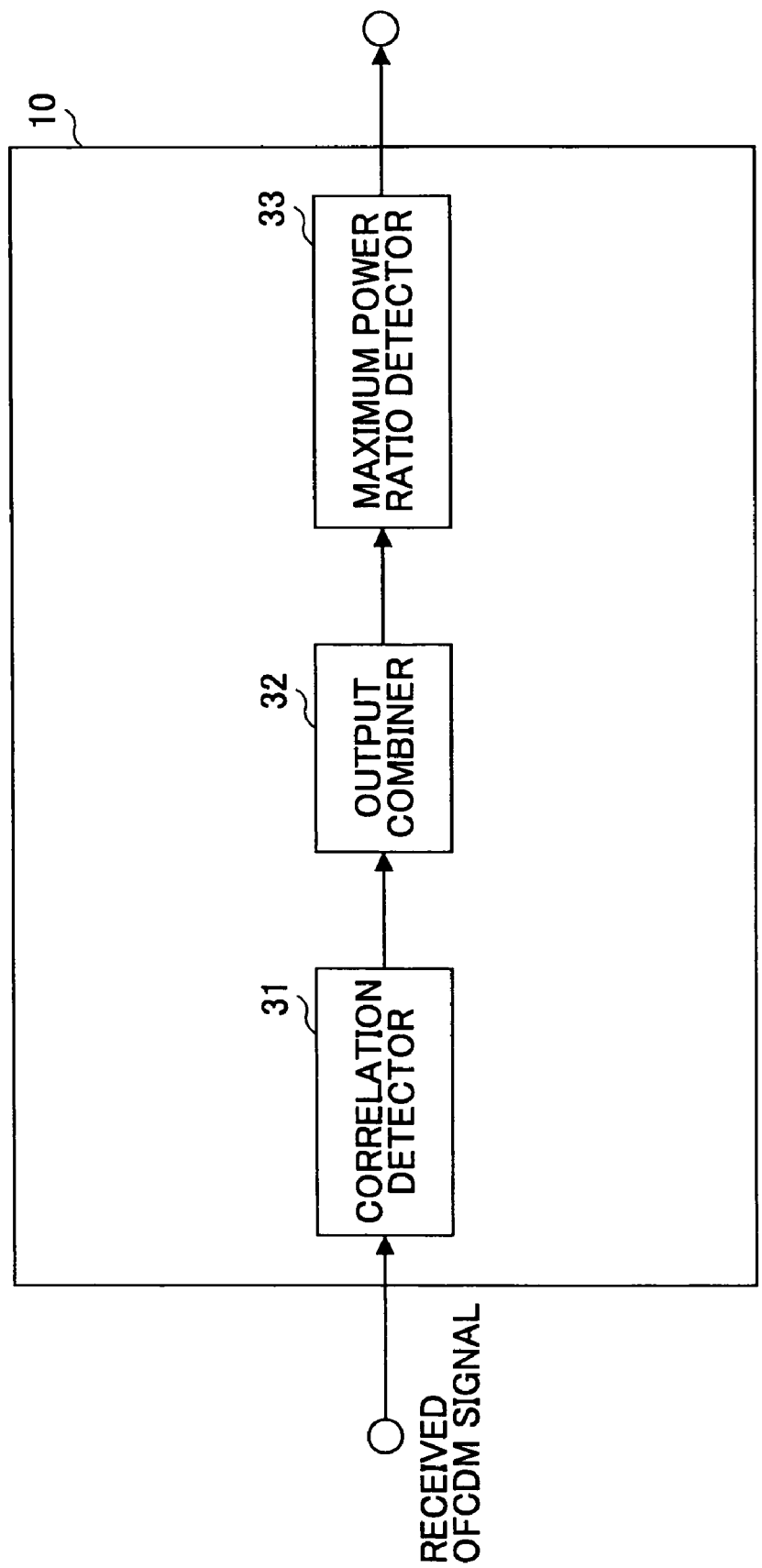
FIG. 2 is a block diagram showing a first example of the symbol synchronization timing detection unit 10 according to the embodiment of the present invention.

FIG. 2 is a block diagram showing a first example of the symbol synchronization timing detection unit 10 according to the embodiment of the present invention.

As illustrated in FIG. 2, the symbol synchronization timing detection unit 10 includes a correlation detection unit 31, an output combination unit 32, and a maximum electric power ratio detection unit 33.

Utilizing received signal information, the symbol synchronization timing detection unit 10 detects the symbol synchronization timing so that the ratio of the electric power of a received signal after FFT (Fast Fourier Transform) to interference power becomes a maximum. In the present example, the received OFCDM signal indicates the signal before being input to the guard interval removing unit 11.

An operation of the symbol synchronization timing detection unit 10 in FIG. 2 is described below.

The received OFCDM signals are input to the correlation detection unit 31, and the obtained correlation values are output to the output combination unit 32. The output combination unit 32 combines the correlation values in a certain section. Then, the maximum electric power ratio detection unit 33 detects a timing at which the ratio of the electric power of the received signal to interference power is a maximum, and this timing is regarded as the symbol synchronization timing.

Figure 3:
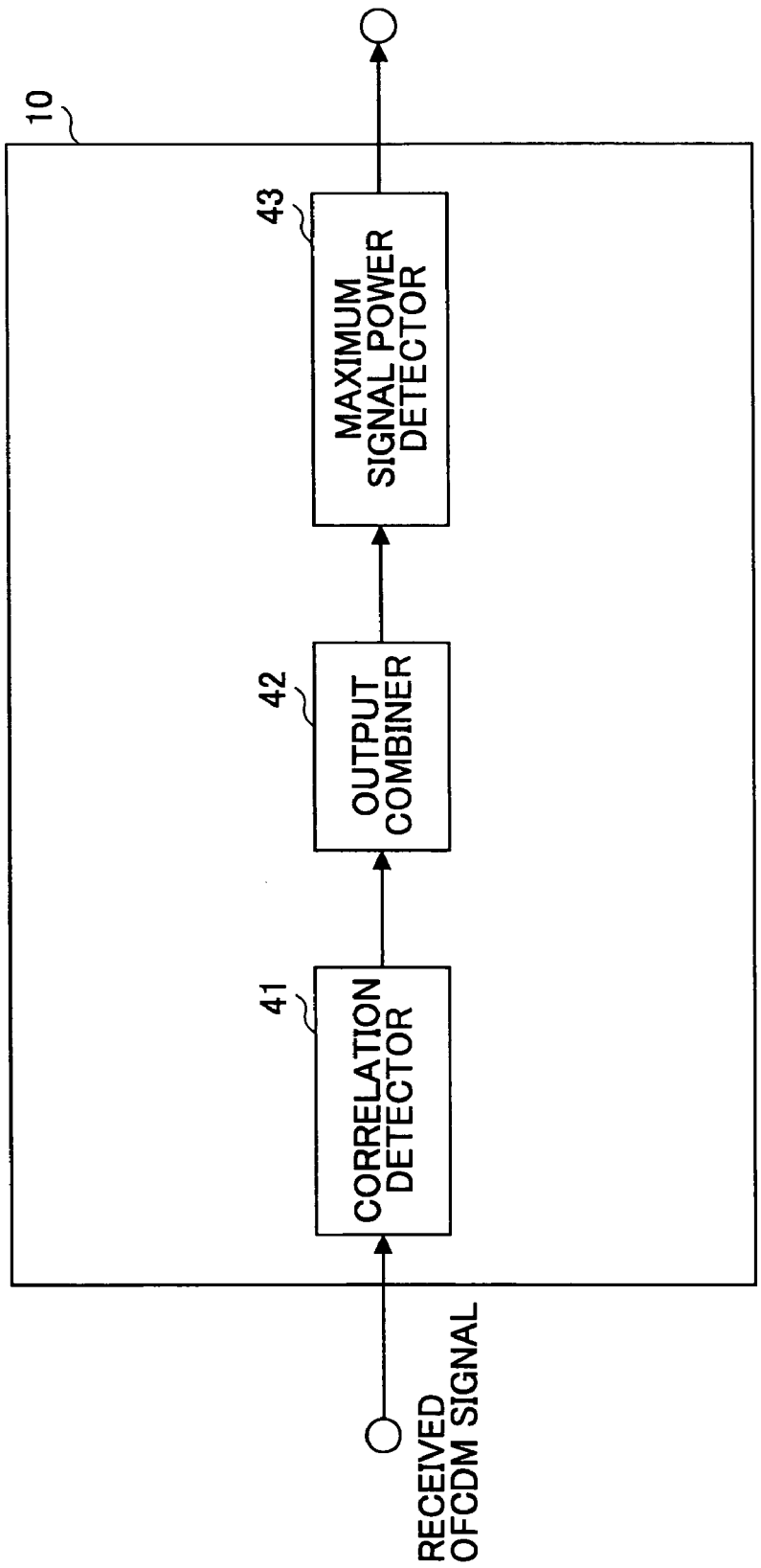
FIG. 3 is a block diagram showing a second example of the symbol synchronization timing detection unit according to the embodiment of the present invention.

FIG. 3 is a block diagram showing a second example of the symbol synchronization timing detection unit according to the embodiment of the present invention.

In this example, as illustrated in FIG. 3, the symbol synchronization timing detection unit 10 includes a correlation detection unit 41, an output combination unit 42, and a maximum signal power detection unit 43.

Utilizing received signal information, the symbol synchronization timing detection unit 10 detects the symbol synchronization timing so that the electric power of a received signal after FFT is a maximum. In the present example, the same as the previous example, the received OFCDM signal indicates the signal before being input to the guard interval removing unit 11.

An operation of the symbol synchronization timing detection unit 10 in FIG. 3 is described below.

The received OFCDM signals are input to the correlation detection unit 41, and the obtained correlation values are output to the output combination unit 42. The output combination unit 42 combines the correlation values in a certain section. Then, the maximum signal power detection unit 43 detects a timing at which the electric power of the received signal is a maximum, and this timing is regarded as the symbol synchronization timing.

Figure 4:
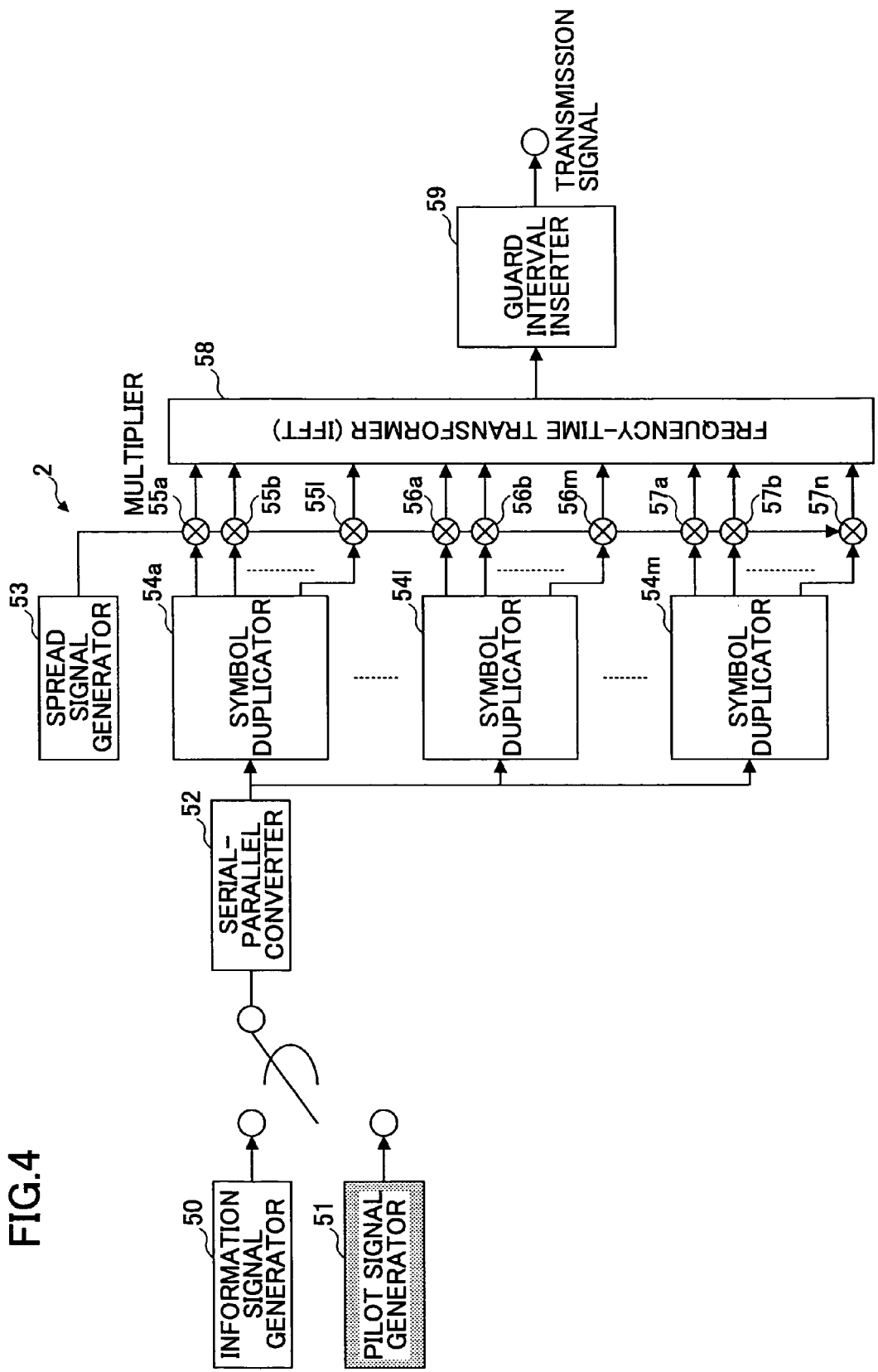
FIG. 4 is a block diagram showing a first example of an OFCDM transmission device according to the embodiment of the present invention.

FIG. 4 is a block diagram showing a first example of an OFCDM transmission device according to the embodiment of the present invention. The OFCDM transmission device, acting as a device at the transmitting end, transmits pilot signals, in addition to the information signal, for detecting the symbol synchronization timing, in order for the symbol synchronization timing detection unit 10 of the OFCDM signal reception device 1 to utilize the received signal information to detect the symbol synchronization timing.

As illustrated in FIG. 4, the OFCDM transmission device 2 includes an information signal generation unit 50, a pilot signal generation unit 51, a serial-parallel conversion unit 52, a spread signal generation unit 53, symbol duplication units 54a to 54m, multiplication units 55a, . . . 57n, a frequency-time transformation unit (IFFT) 58, and a guard interval insertion unit 59.

In this example, the information signal generation unit 50 modulates signals to be transmitted and generates information signals. The pilot signal generation unit 51 generates pilot signals. Subsequently, the information signals and the pilot signals are processed in the same way as described below. The serial-parallel conversion unit 52 converts the input signals from serial signals to parallel signals, the symbol duplication units 54a through 54m duplicate the input signals in the time axis and frequency axis, the spread signal generation unit 53 and the multiplication units 55a, . . . 57n perform multiplication of the spread signals in the time axis and the frequency axis, and the frequency-time transformation unit (IFFT) 58 performs a frequency-time transformation on the input signals. As a result, the input signals are converted to OFCDM signals.

The pilot signals may be transmitted while being appended to the information signal, or be transmitted separately relative to the information signal.

Figure 5:
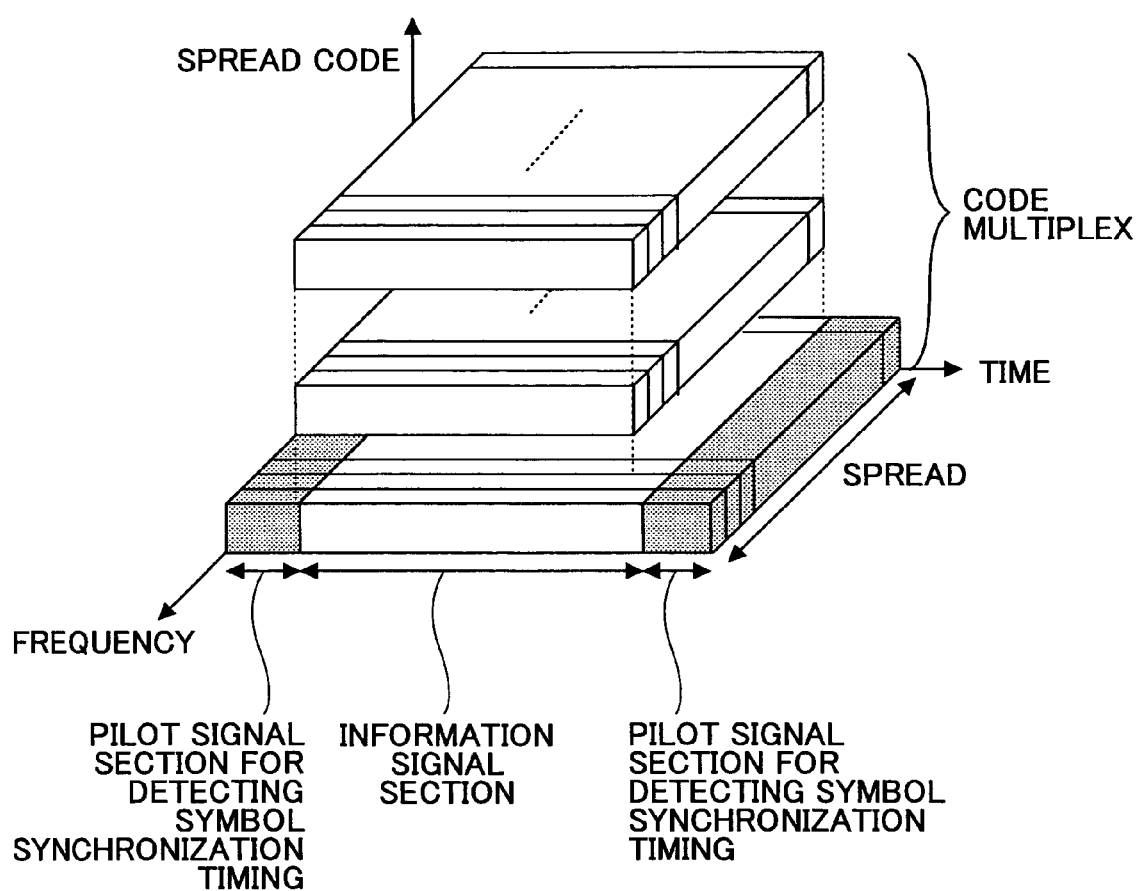
FIG. 5 is a view schematically showing an example of the transmission method of the pilot signals for detection of the symbol synchronization timing.

FIG. 5 is a view schematically showing an example of the transmission method of the pilot signals, for detection of the symbol synchronization timing in the OFCDM transmission device in FIG. 4.

As illustrated in FIG. 5, the pilot signals, which are used for detection of the symbol synchronization timing, are time-multiplexed in an information signal section and a pilot signal section.

Certainly, transmission of the pilot signals is not limited to the time-multiplexed transmission as illustrated in FIG. 4 and FIG. 5. Other examples are presented below.

Figure 6:
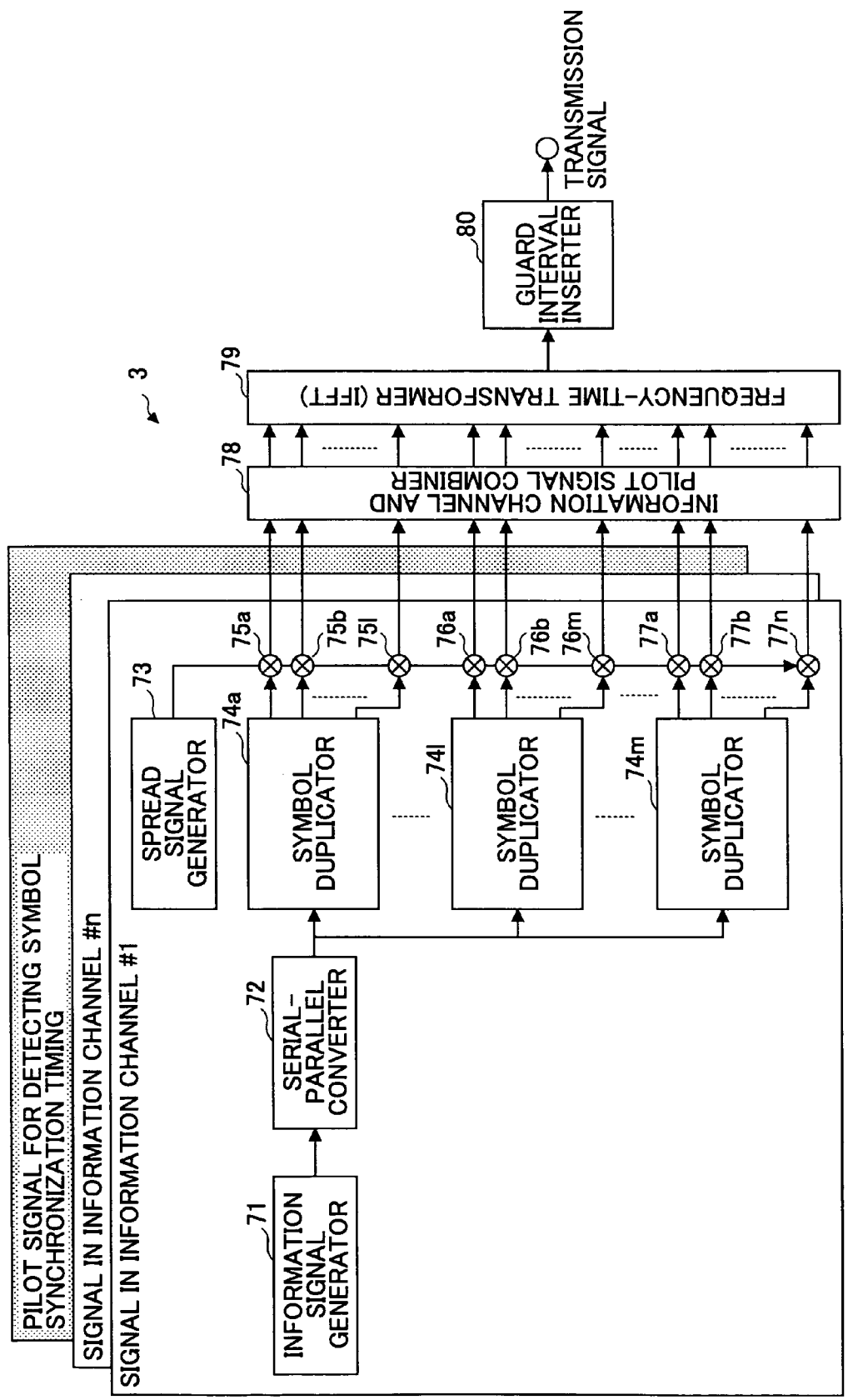
FIG. 6 is a block diagram showing a second example of the OFCDM transmission device according to the embodiment of the present invention.

FIG. 6 is a block diagram showing a second example of the OFCDM transmission device according to the embodiment of the present invention.

Figure 7:
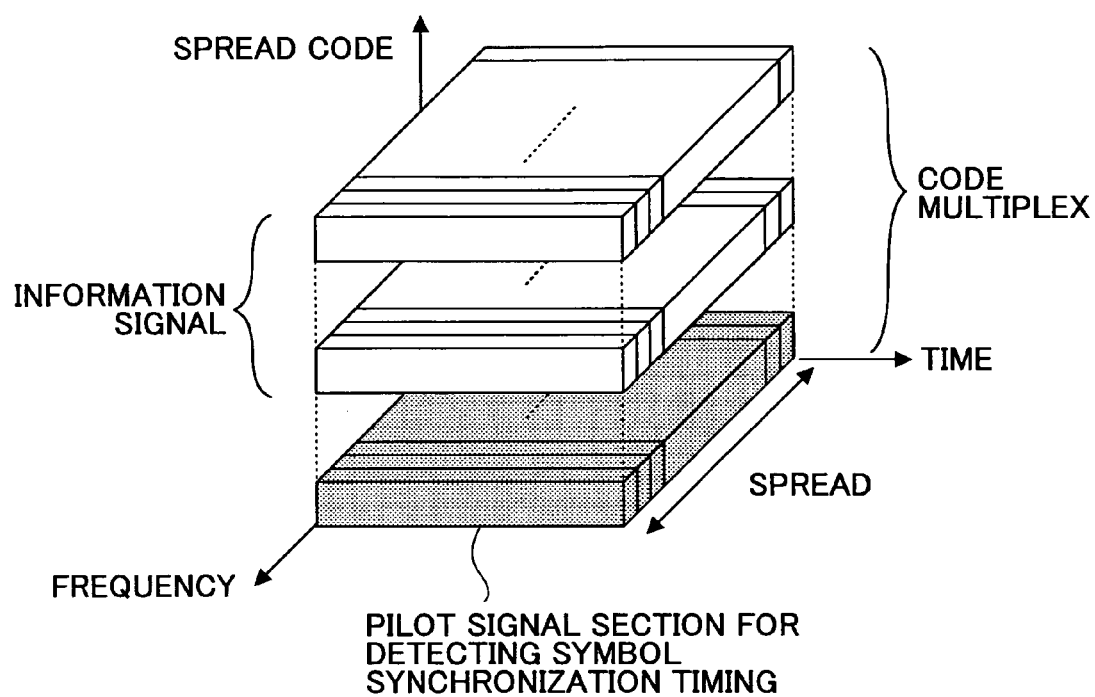
FIG. 7 is a view schematically showing a second example of the transmission method of the pilot signals in the OFCDM transmission device.

FIG. 7 is a view schematically showing a second example of the transmission method of the pilot signals in the OFCDM transmission device in FIG. 6.

As illustrated in FIG. 6 and FIG. 7, the information signal (here, signal in information channels #1 to #n) and the pilot signal for detection of the symbol synchronization timing are spread by using different spread codes, respectively, and are multiplexed, namely, adopting a code multiplex configuration.

Figure 8:
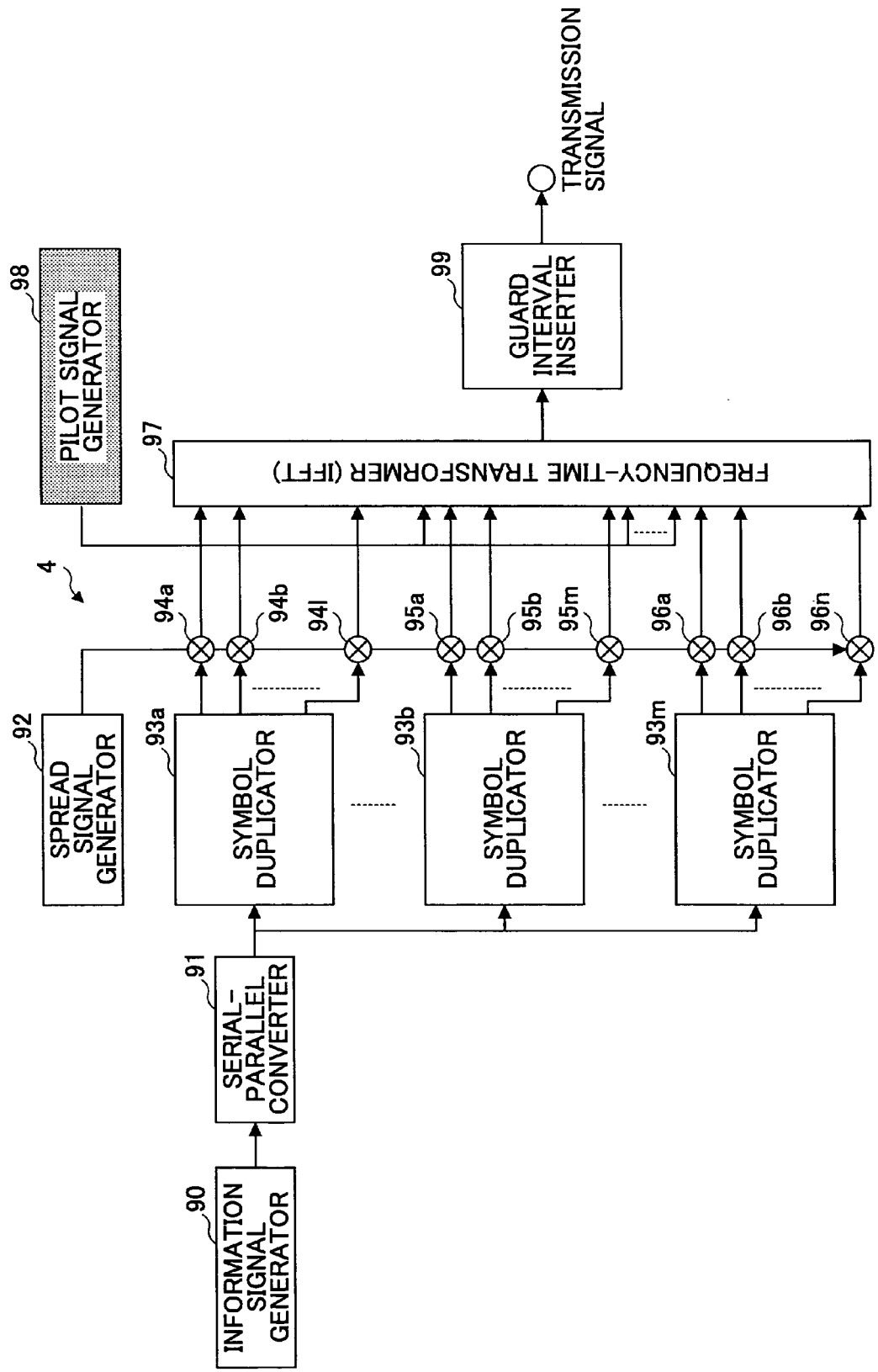
FIG. 8 is a block diagram showing a third example of the OFCDM transmission device according to the embodiment of the present invention.

FIG. 8 is a block diagram showing a third example of the OFCDM transmission device according to the embodiment of the present invention.

Figure 9:
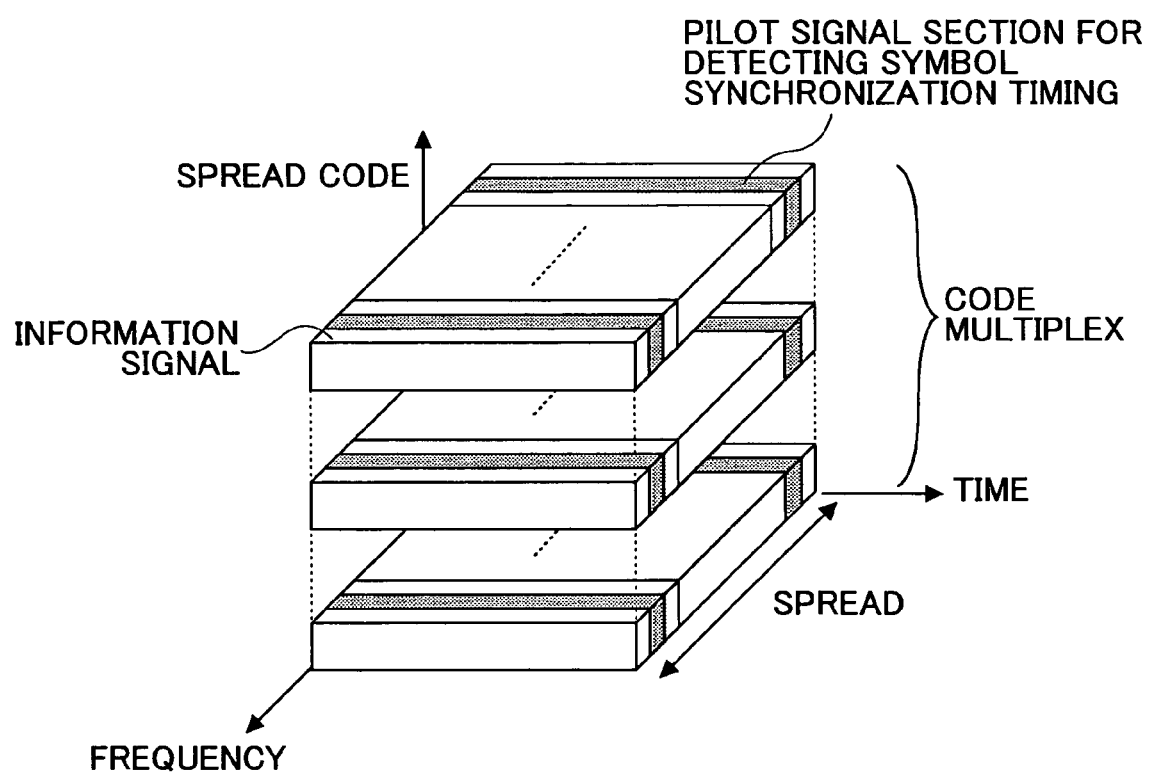
FIG. 9 is a view schematically showing a third example of the transmission method of the pilot signals.

FIG. 9 is a view schematically showing a third example of the transmission method of the pilot signals in the OFCDM transmission device in FIG. 8.

As illustrated in FIG. 8 and FIG. 9, the pilot signal for detection of the symbol synchronization timing is input to a frequency-time transformation unit (IFFT) 97, and the pilot signal is multiplexed on a specific sub-carrier frequency, namely, adopting a frequency multiplex configuration.

Further, the pilot signal may be a common pilot signal obtained by multiplying common spread codes for all information channels; alternatively, the pilot signal may be a dedicated pilot signal obtained by multiplying spread codes each dedicated to one information channel.

Figure 10:
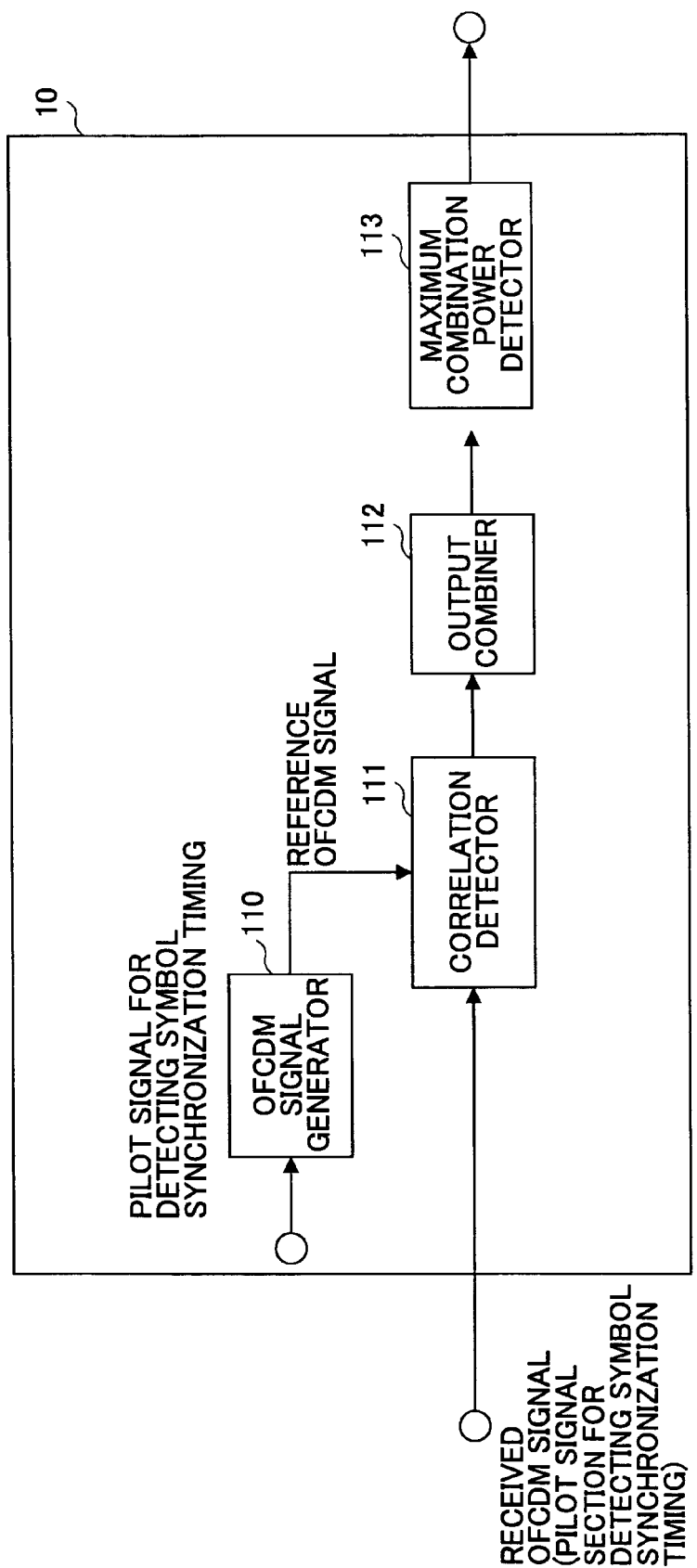
FIG. 10 is a block diagram showing a third example of the symbol synchronization timing detection unit 10 of the OFCDM signal reception device 1 according to the embodiment of the present invention.

FIG. 10 is a block diagram showing a third example of the symbol synchronization timing detection unit 10 of the OFCDM signal reception device 1 according to the embodiment of the present invention.

When the pilot signal for detection of the symbol synchronization timing is transmitted from the OFCDM transmission device illustrated in one of FIG. 4, FIG. 6, and FIG. 8, the symbol synchronization timing detection unit 10 utilizes correlation values between the received signals as the received signal information to detect the symbol synchronization timing.

As illustrated in FIG. 10, the symbol synchronization timing detection unit 10 includes an OFCDM signal generation unit 110, a correlation detection unit 111, an output combination unit 112, and a maximum combination power detection unit 113. In this example, the received OFCDM signal indicates the signal before being input to the guard interval removing unit 11.

In this example, known pilot signals are input to the OFCDM signal generation unit 110, and reference OFCDM signals are generated. The received OFCDM signals and the reference OFCDM signals are input to the correlation detection unit 111. The correlation detection unit 111 calculates correlation values between the reference OFCDM signals and the pilot signal section of the received OFCDM signals. The obtained correlation values are output to the output combination unit 112. The output combination unit 112 combines the correlation values in a certain section. Then, the maximum combination power detection unit 113 detects a timing at which the combination power is a maximum, and this timing is regarded as the symbol synchronization timing.

Figure 11:
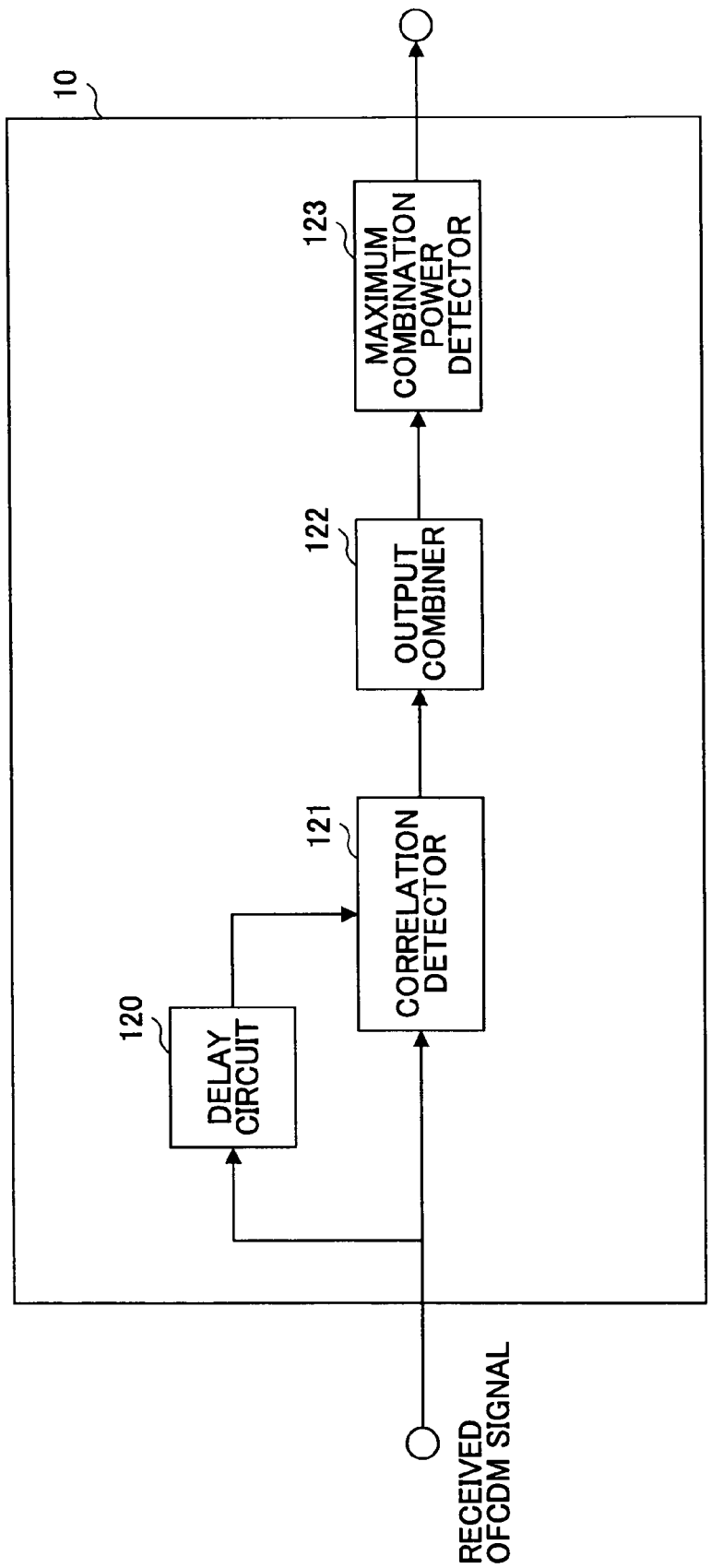
FIG. 11 is a block diagram showing a fourth example of the symbol synchronization timing detection unit 10 of the OFCDM signal reception device 1 according to the embodiment of the present invention.

Namely, in the example shown in FIG. 10, correlation values between the received signals are used as the received signal information for detection of the symbol synchronization timing. FIG. 11 presents another example.

FIG. 11 is a block diagram showing a fourth example of the symbol synchronization timing detection unit 10 of the OFCDM signal reception device 1 according to the embodiment of the present invention. In FIG. 11, the symbol synchronization timing detection unit 10 utilizes the guard interval section in the received OFCDM signals as the received signal information to detect the symbol synchronization timing.

As illustrated in FIG. 11, the symbol synchronization timing detection unit 10 includes a delay circuit 120, a correlation detection unit 121, an output combination unit 122, and a maximum combination power detection unit 123. In this example, the received OFCDM signal indicates the signal before being input to the guard interval removing unit 11.

In this example, received OFCDM signals are input to the delay circuit 120, and the delay circuit 120 sets a delay time T, that is, delay the input signal by a duration T. The received OFCDM signals and the delayed OFCDM signals from the delay circuit 120 are input to the correlation detection unit 121. The correlation detection unit 121 calculates auto-correlation values between the guard interval section and the information symbol section. The obtained auto-correlation values are output to the output combination unit 122. The output combination unit 122 combines the auto-correlation values in a certain section. Then, the maximum combination power detection unit 123 detects a timing at which the combination power is a maximum, and this timing is regarded as the symbol synchronization timing.

Figure 12:
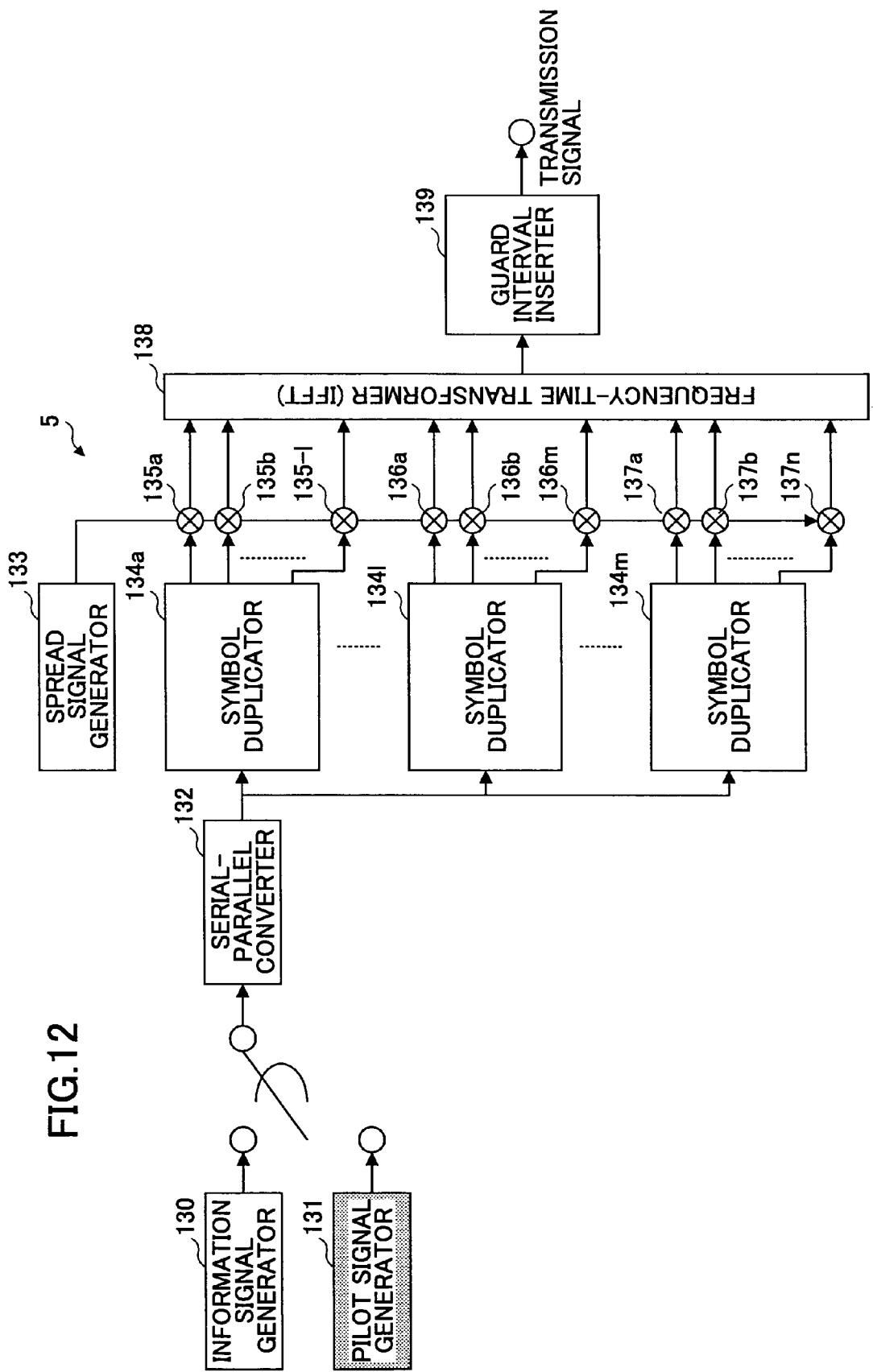
FIG. 12 is a block diagram showing a fourth example of the OFCDM transmission device according to the embodiment of the present invention.

FIG. 12 is a block diagram showing a fourth example of the OFCDM transmission device according to the embodiment of the present invention.

The OFCDM transmission device transmits known pilot signals in addition to the information signals for estimation of a propagation path change, in order for the symbol synchronization timing detection unit 10 of the OFCDM signal reception device 1 to utilize the estimation of the propagation path change to detect the symbol synchronization timing.

As illustrated in FIG. 12, the OFCDM transmission device 5 includes an information signal generation unit 130 for estimating a propagation path change, a pilot signal generation unit 131, a serial-parallel conversion unit 132, a spread signal generation unit 133, symbol duplication units 134a to 134m, multiplication units 135a, . . . 137n, a frequency-time transformation unit (IFFT) 138, and a guard interval insertion unit 139.

In this example, the information signal generation unit 130 modulates signals to be transmitted and generates information signals. The pilot signal generation unit 131 generates pilot signals for estimating a propagation path change. Subsequently, the information signals and the pilot signals are both processed in the following way. Namely, the serial-parallel conversion unit 132 converts the input signals from serial signals to parallel signals, the symbol duplication units 134a to 134m duplicate the input signals in the time axis and frequency axis, the spread signal generation unit 133 and the multiplication units 135a, . . . 137n perform multiplication of the spread signals in the time axis and the frequency axis, and the frequency-time transformation unit (IFFT) 138 performs a frequency-time transformation on the input signals. As a result, the input signals are converted to OFCDM signals.

The pilot signals may be transmitted while being appended to the information signal, or be transmitted separately relative to the information signal.

Figure 13:
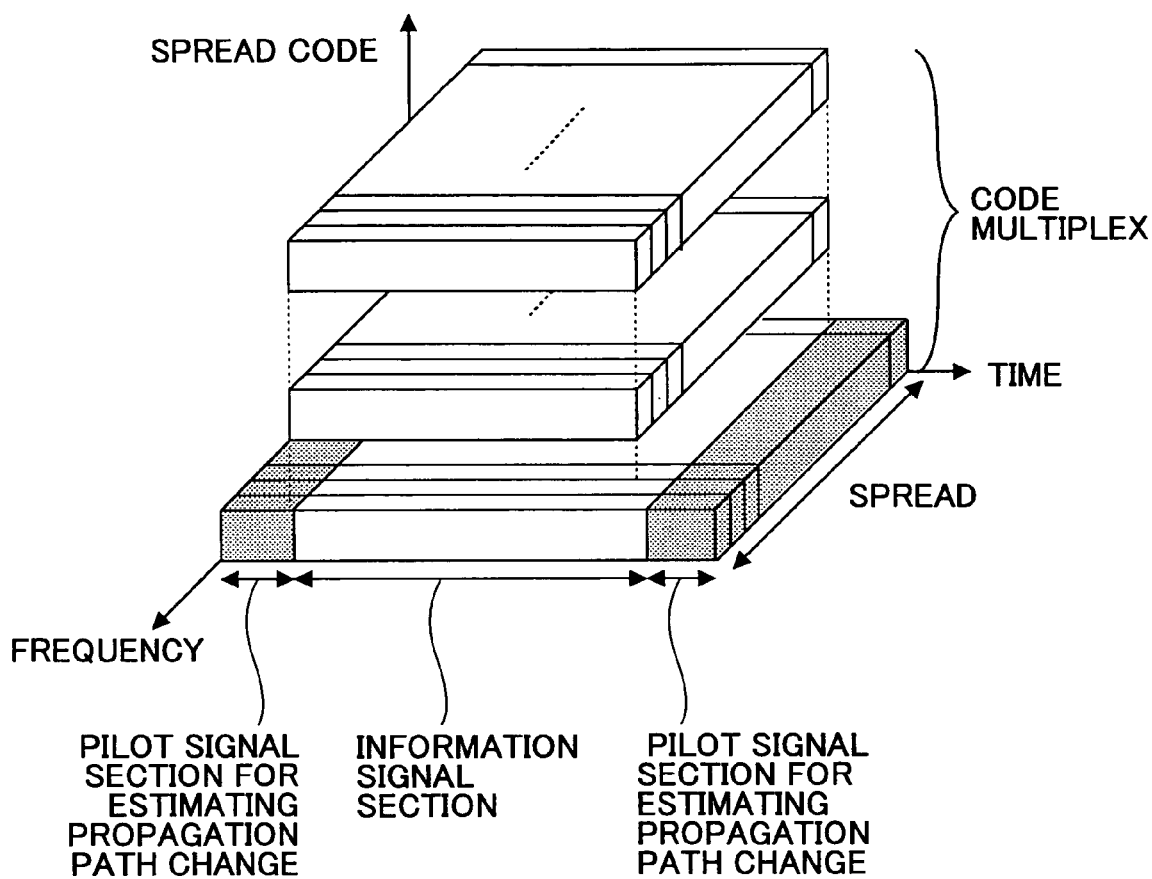
FIG. 13 is a view schematically showing a fourth example of the transmission method of the pilot signals in the OFCDM transmission device in FIG. 12.

FIG. 13 is a view schematically showing a fourth example of the transmission method of the pilot signals in the OFCDM transmission device in FIG. 12.

As illustrated in FIG. 13, the pilot signals, which are used for estimating a propagation path change, are time-multiplexed in an information signal section and a pilot signal section. As illustrated in FIG. 6 and FIG. 7, the information signal and the pilot signal may also be spread with different spread codes and multiplexed, namely, adopting a code multiplex configuration. Alternatively, as illustrated in FIG. 8 and FIG. 9, the pilot signal may also be multiplexed on a specific sub-carrier frequency, namely, adopting a frequency multiplex configuration.

Further, the pilot signal may be a common pilot signal obtained by multiplying common spread codes for all information channels; alternatively, the pilot signal may be a dedicated pilot signal obtained by multiplying spread codes each dedicated to one information channel.

Figure 14:
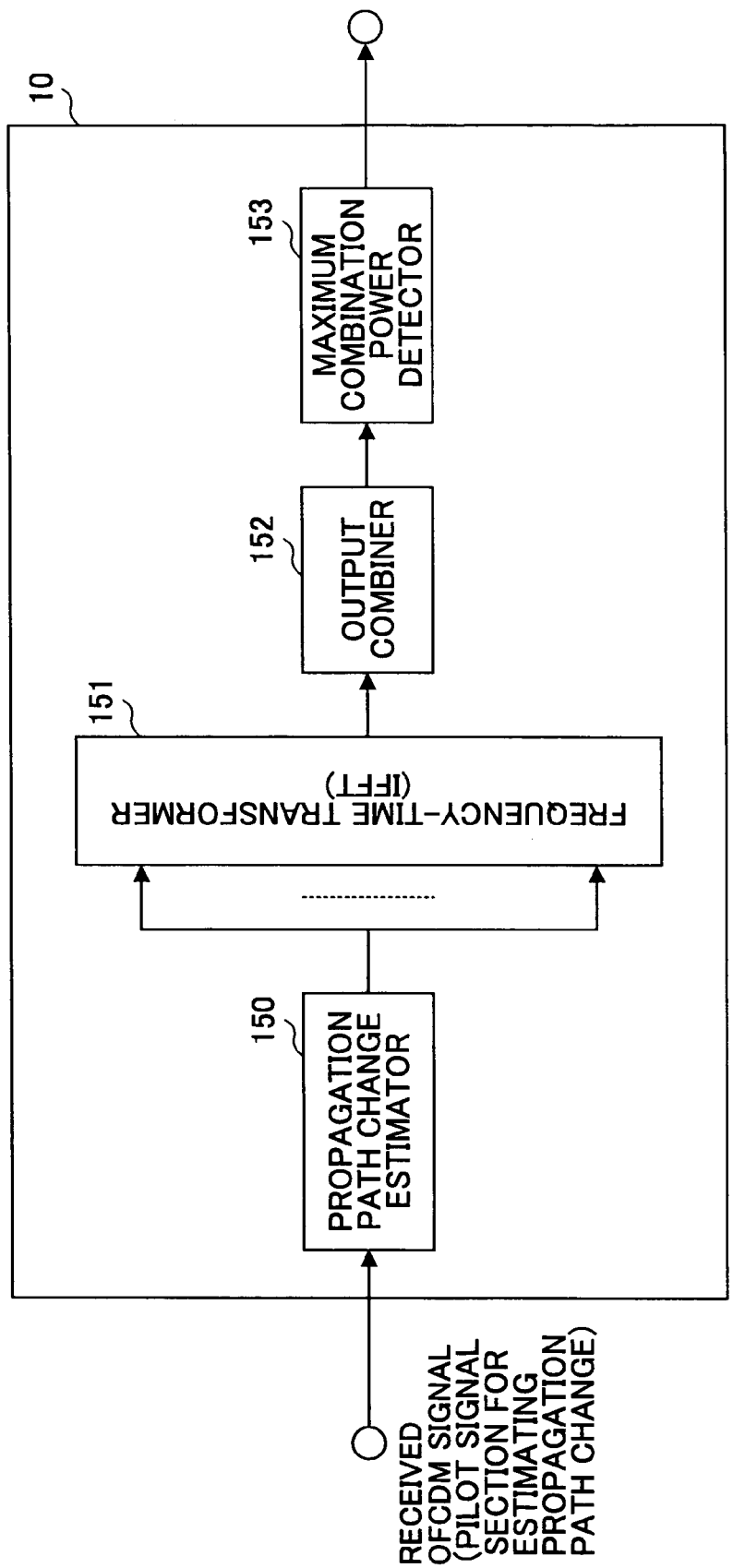
FIG. 14 is a block diagram showing a fifth example of the symbol synchronization timing detection unit 10 of the OFCDM signal reception device 1 according to the embodiment of the present invention.

FIG. 14 is a block diagram showing a fifth example of the symbol synchronization timing detection unit 10 of the OFCDM signal reception device 1 according to the embodiment of the present invention.

When the pilot signal for estimating a propagation path change is transmitted from the OFCDM transmission device 5 illustrated in FIG. 12, the symbol synchronization timing detection unit 10 estimates the propagation path change based on the pilot signal, and utilizes the estimation value to detect the symbol synchronization timing.

As illustrated in FIG. 14, the symbol synchronization timing detection unit 10 includes a propagation path change estimation unit 150, a frequency-time transformation unit (IFFT) 151, an output combination unit 152, and a maximum combination power detection unit 153. In this example, the received OFCDM signal indicates the signal before being input to the guard interval removing unit 11.

In this example, first, using the pilot signal for estimating a propagation path change from the OFCDM transmission device 5 to the symbol synchronization timing detection unit 10, the propagation path change estimation unit 150 estimates influence of the propagation path change on the signals transmitted from the OFCDM transmission device 5 for each sub-carrier frequency. Because of the known amplitude, phase, and pattern of the pilot signal, the propagation path change can be estimated from changes of the pilot signals.

The thus obtained propagation path changes for each sub-carrier frequency by the propagation path change estimation unit 150 are input to the frequency-time transformation unit (IFFT) 151, and the frequency-time transformation unit (IFFT) 151 finds the impulse response of the propagation path, namely, a complex delay profile. The thus obtained complex delay profile, that is, the propagation path changes for each sub-carrier frequency, is input to the output combination unit 152. The output combination unit 152 combines the correlation values in a certain section. Then, the maximum combination power detection unit 153 detects a timing at which the combination power is a maximum, and this timing is regarded as the symbol synchronization timing.

As described above, in this example, the delay profile is obtained from the propagation path changes for each sub-carrier frequency. Of course, the delay profile can also be directly calculated by using the pilot signal for estimating a propagation path change.

Figure 15:
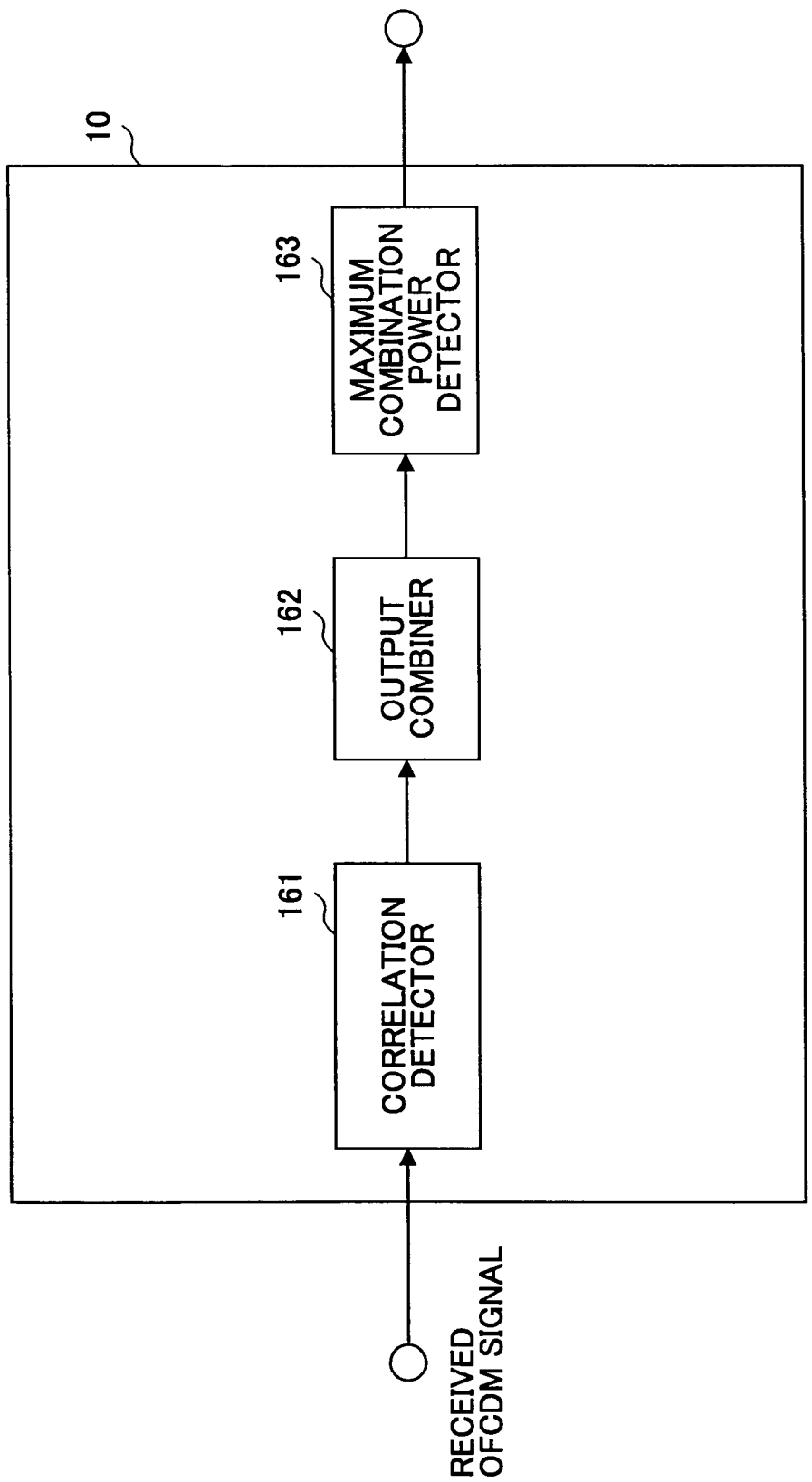
FIG. 15 is a block diagram showing a sixth example of the symbol synchronization timing detection unit 10 of the OFCDM signal reception device 1 according to the embodiment of the present invention.

FIG. 15 is a block diagram showing a sixth example of the symbol synchronization timing detection unit 10 of the OFCDM signal reception device 1 according to the embodiment of the present invention. In this example, the symbol synchronization timing detection unit 10 utilizes a combined value of the received signal information in a certain section to detect the symbol synchronization timing.

As illustrated in FIG. 15, the symbol synchronization timing detection unit 10 includes a correlation detection unit 161, an output combination unit 162, and a maximum combination power detection unit 163.

Generally, because the OFCDM signal is constructed by superposing information signals related to each of the sub-carriers, in accordance with the central limit theorem, the OFCDM signal has a Gaussian noise-like waveform. Hence, in the received signal information shown with reference to FIG. 10, FIG. 11, and FIG. 12 (that is, (1) correlation values between known pilot signals, (2) auto-correlation values of the received signals, (3) estimation of a propagation path change), when the delay spread of the received signal in the multi-path propagation path is small, as shown in FIG. 16, the maximum of the correlation output is at a timing essentially equal to the ideal symbol synchronization timing.

Figure 16:
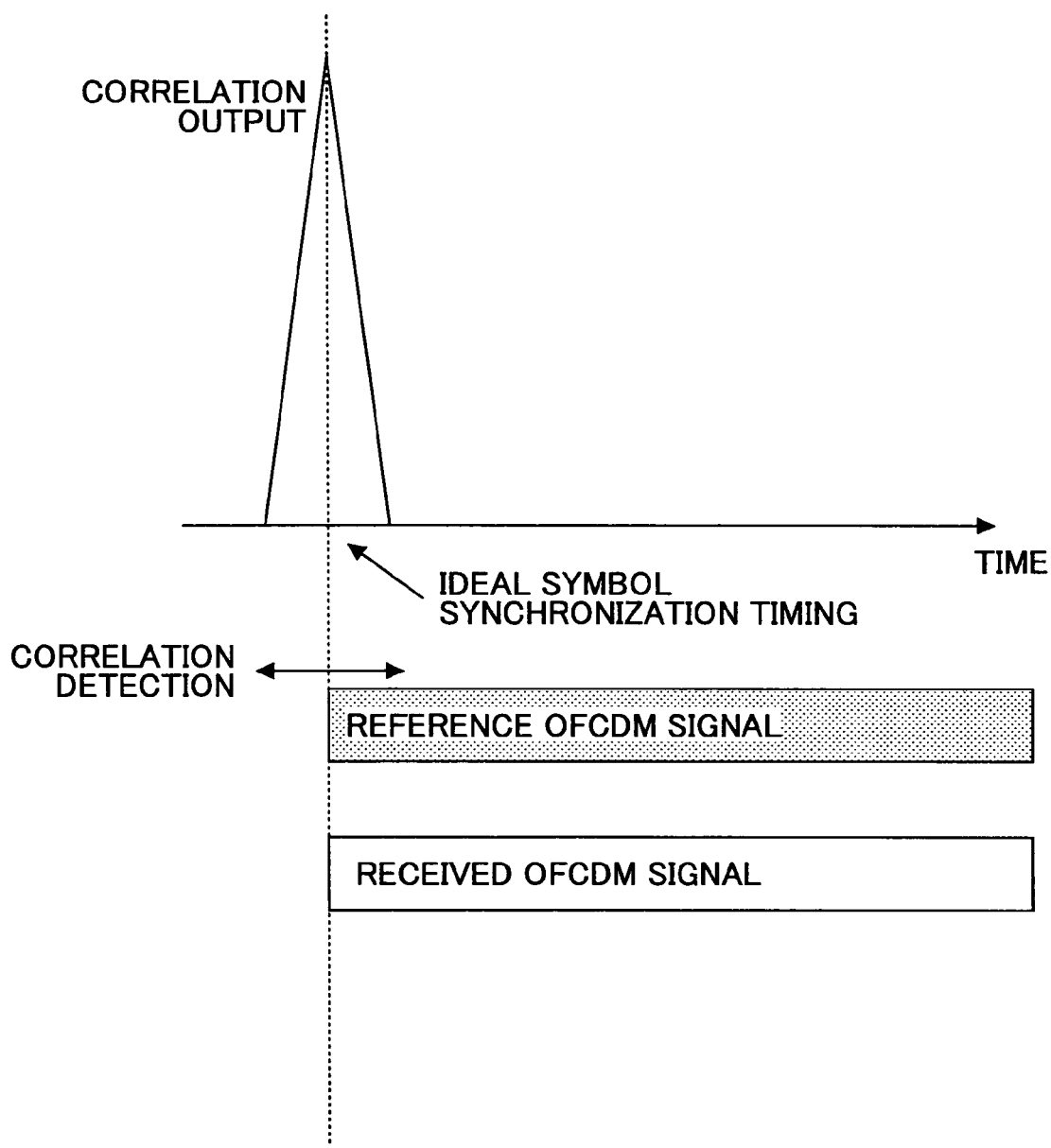
FIG. 16 is a diagram for illustrating the relation between the timing of the maximum of the correlation output and the ideal symbol synchronization timing in an ideal case.

FIG. 16 is a diagram for illustrating the relation between the timing of the maximum of the correlation output and the ideal symbol synchronization timing in an ideal case.

Hence, by estimating the timing at which the correlation output is a maximum, it is possible to detect the appropriate symbol synchronization timing.

Figure 17:
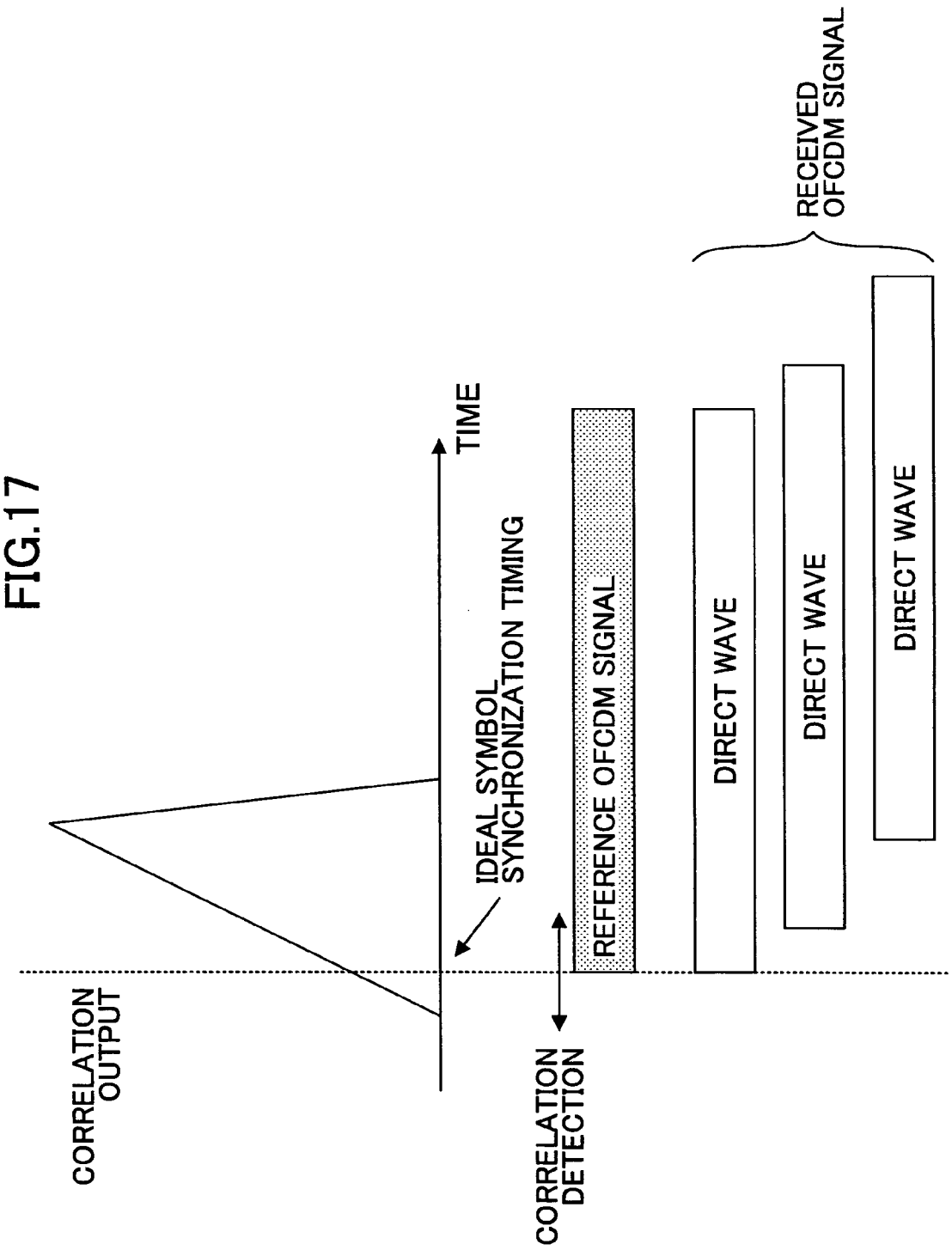
FIG. 17 is a diagram illustrating the relation between the timing of the maximum of the correlation output and the ideal symbol synchronization timing in a practical case.

However, in the multi-path propagation path, for example, because of geographic conditions of the transmission path, the delay spread of the received signal may be sufficiently large, as illustrated in FIG. 17.

FIG. 17 is a diagram illustrating the relation between the timing of the maximum of the correlation output and the ideal symbol synchronization timing in a practical case.

In this case, as shown in FIG. 17, the timing of the maximum of the correlation output may greatly deviate from the ideal symbol synchronization timing, hence inter-symbol interference occurs.

Figure 18:
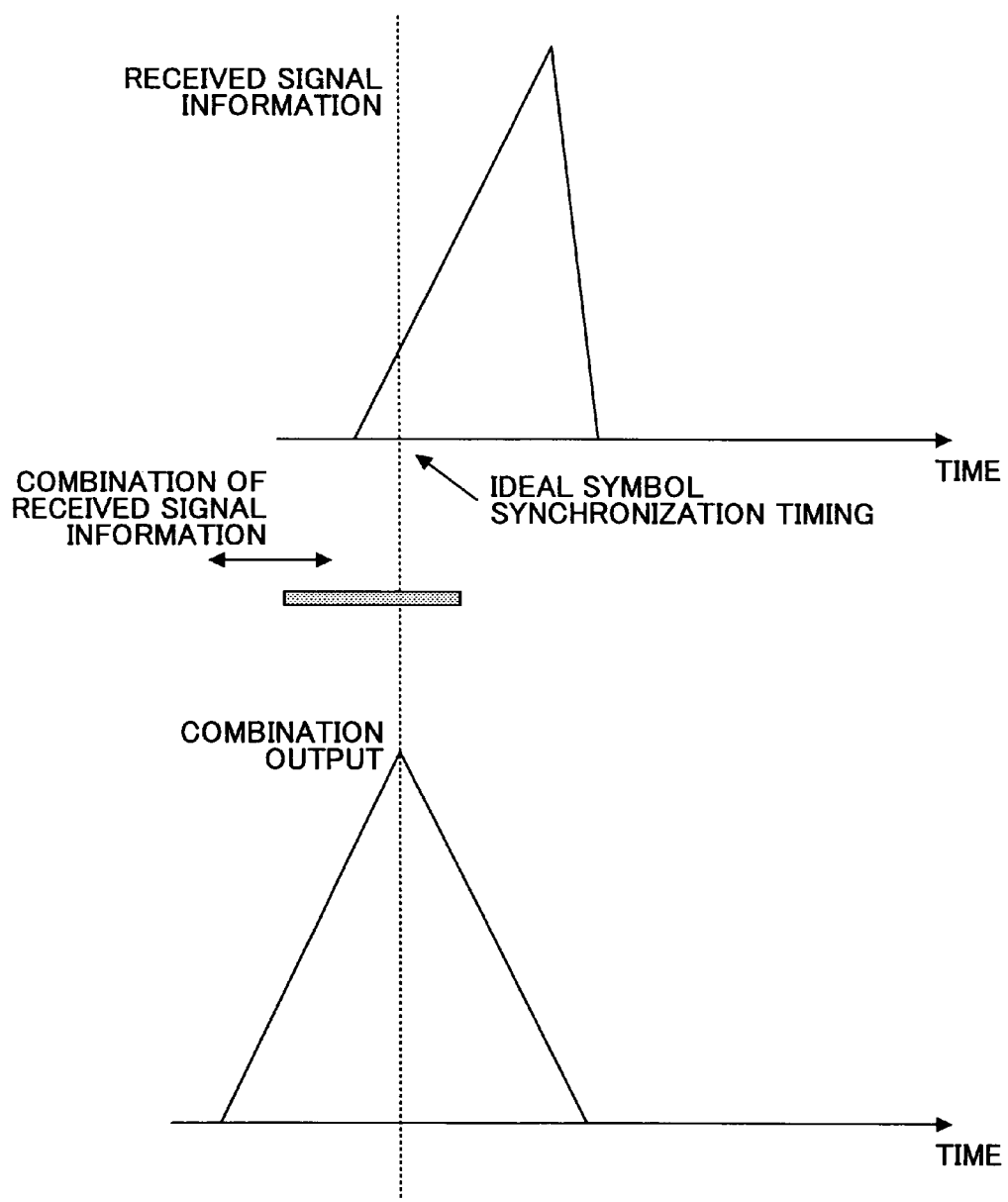
FIG. 18 illustrates a method of detecting the symbol synchronization timing according to the present invention.

In the present invention, as shown in FIG. 18, the output combination unit 162 combines the obtained received signal information, the maximum combination power detection unit 163 detects the timing at which the combined power is a maximum, and this timing is regarded as the symbol synchronization timing.

FIG. 18 illustrates a method of detecting the symbol synchronization timing according to the present invention.

In doing so, even when the timing of the maximum of the correlation output deviates from the ideal symbol synchronization timing due to multi-path interference, in the FFT window section it is possible to detect the symbol synchronization timing, corresponding to the propagation path conditions, which maintains electric powers of a direct wave component and a delay wave component of a symbol in the OFCDM signal as much as possible, and therefore it is possible to reduce interference from adjacent symbols.

Figure 19:
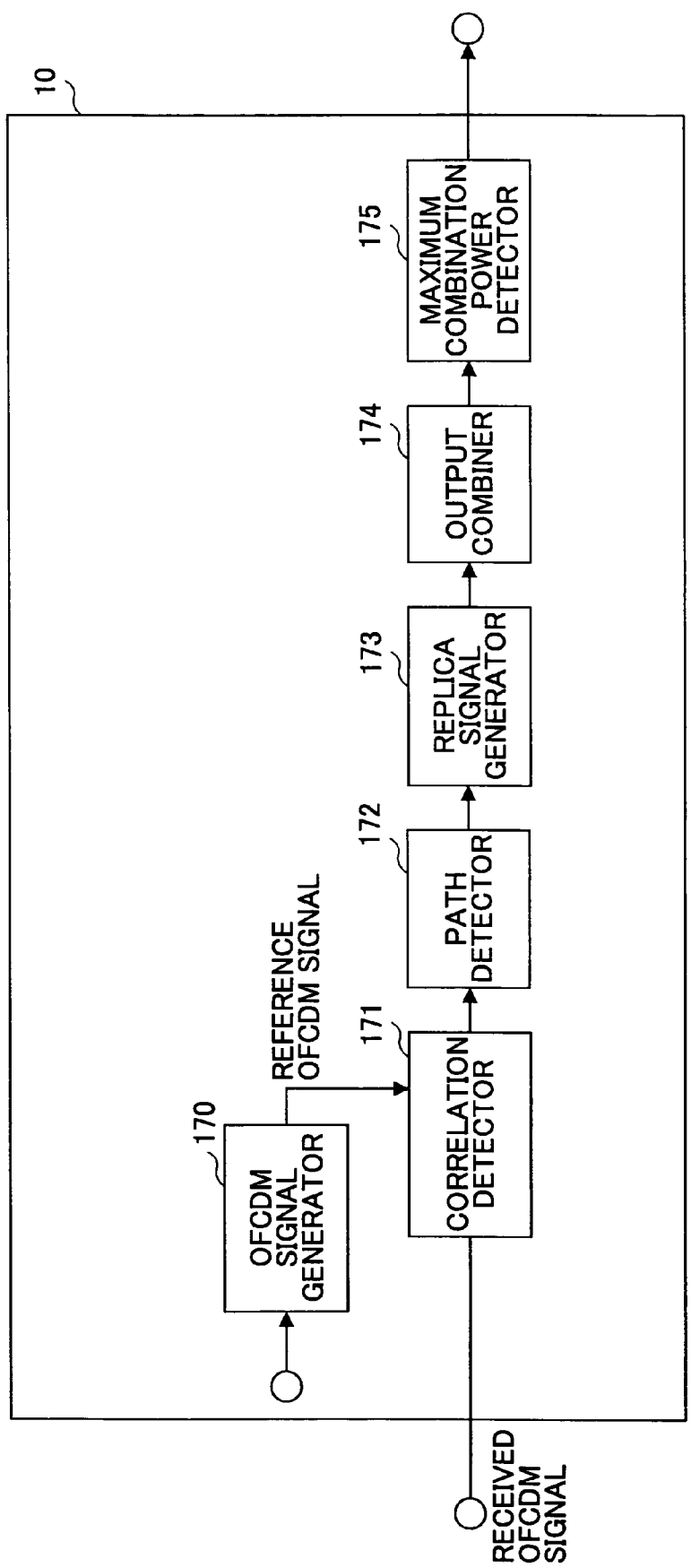
FIG. 19 is a block diagram showing a seventh example of the symbol synchronization timing detection unit 10 of the OFCDM signal reception device 1 according to the embodiment of the present invention.

FIG. 19 is a block diagram showing a sixth example of the symbol synchronization timing detection unit 10 of the OFCDM signal reception device 1 according to the embodiment of the present invention.

When estimating the ratio of the electric power of a received signal to interference power, the symbol synchronization timing detection unit 10, by using the received signal information, generates replica signals of a desired signal and an interference signal, respectively, and detects the symbol synchronization timing by using the replica signals.

For example, below, it is assumed that the correlation values between known pilot signals are used as the received signal information for estimating the ratio of the received signal power to interference power.

As illustrated in FIG. 19, the symbol synchronization timing detection unit 10 includes an OFCDM signal generation unit 170, a correlation detection unit 171, a path detection unit 172, a replica signal generation unit 173, an output combination unit 174, and a maximum combination power detection unit 175.

Figure 20:
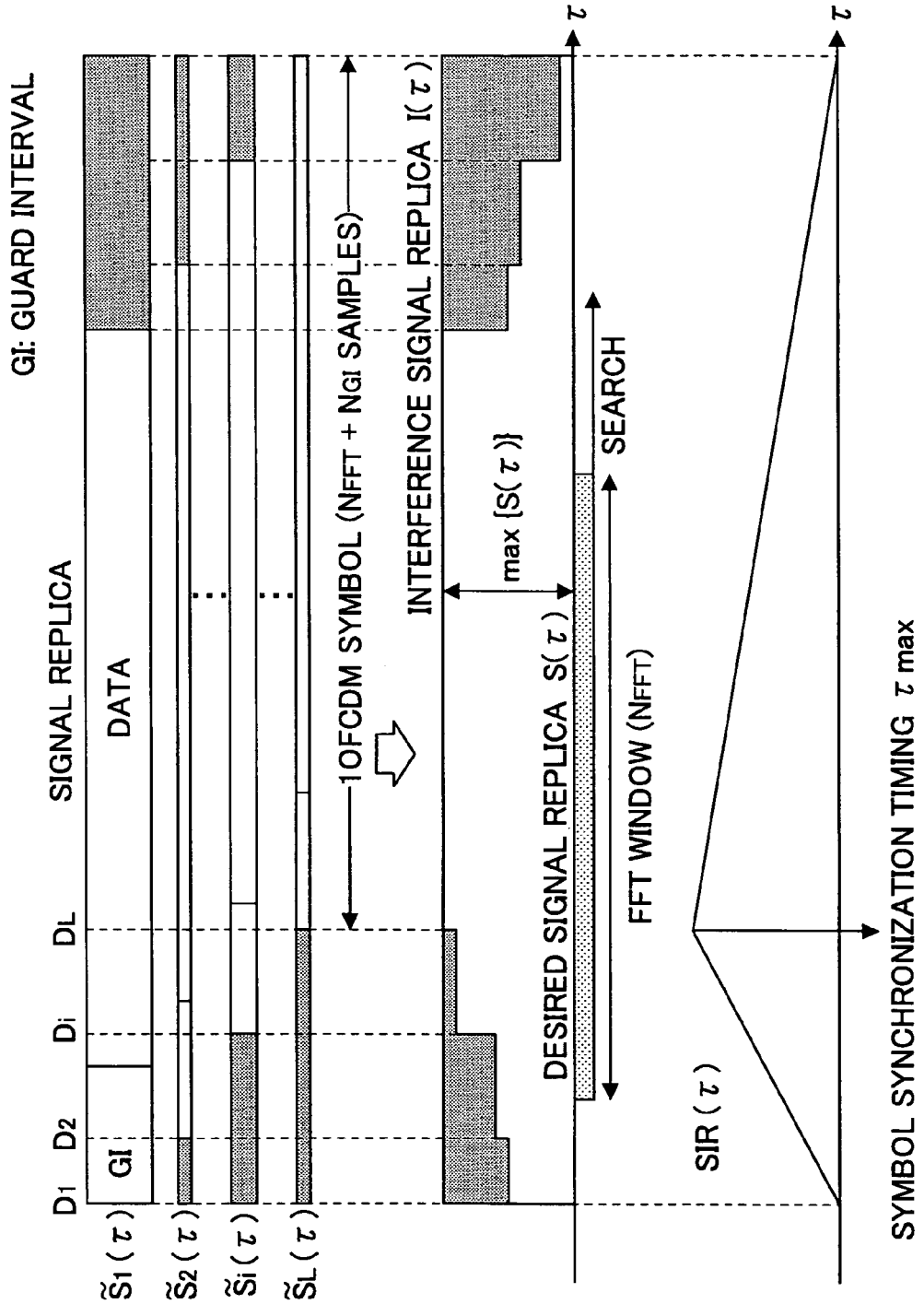
FIG. 20 is a diagram schematically illustrating a first example of the method of detecting the symbol synchronization timing by the symbol synchronization timing detection unit 10 in FIG. 19 according to the embodiment of the present invention.

FIG. 20 is a diagram schematically illustrating a first example of the method of detecting the symbol synchronization timing by the symbol synchronization timing detection unit 10 in FIG. 19, according to the embodiment of the present invention.

Below, operations of the symbol synchronization timing detection unit 10 are explained with reference to FIG. 19 through FIG. 21.

In FIG. 20, known pilot signals are input to the OFCDM signal generation unit 170, and the OFCDM signal generation unit 170 generates reference OFCDM signals. The received OFCDM signals and the reference OFCDM signals are input to the correlation detection unit 171. The correlation detection unit 171 calculates correlation values between the reference OFCDM signals and the received OFCDM signals, and generates a delay profile based on the correlations.

Figure 21:
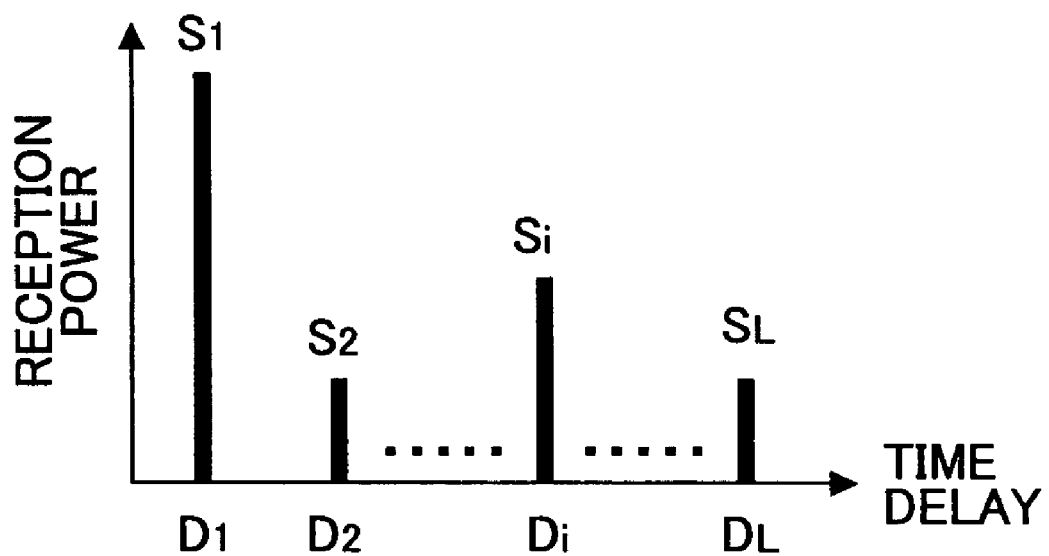
FIG. 21 shows an example of a delay profile.

FIG. 21 shows an example of the delay profile. In FIG. 21, the abscissa represents the propagation delay time of waves coming to the signal receiving end (here, it is the OFCDM signal reception device), and the ordinate represents the reception power. Namely, the delay profile describes a dependence of the reception power of the received waves on their delay time.

The delay profile is output to the path detection unit 172, and the path detection unit 172 detects a delay wave having a large signal power by means of threshold value determination. The thus detected delay wave is referred to as "a path". Here, it is assumed that a number of L paths are detected.

The replica signal generation unit 173 generates replica signals $\tilde{S}_i(\tau)$ for each path, each of the replica signals $\tilde{S}_i(\tau)$ containing a number of $(D_L+N_{FFT}+N_{GI})$ samples, by using electric power Si (i=1, 2, ..., L) of the L paths detected by the path detection unit 172, and the delay time Di (i=1, 2, ..., L) relative to the leading path. Here, $N_{FFT}$ and $N_{GI}$ represent the number of samples in the FFT window section and the guard interval section, respectively.

Here, it is assumed that when $D_i<\tau<D_i+N_{FFT}+N_{GI}$, $\tilde{S}_i(\tau)=Si$, and at other timings, $\tilde{S}_i(\tau)=0$.

Further, by combining the L replica signals related to one sample, a desired signal replica $S(\tau)$ can be obtained.

In addition, an interference signal replica $I(\tau)$ can be found by obtaining the maximum value $\max\{S(\tau)\}$ of the number of $(D_L+N_{FFT}+N_{GI})$ samples of the desired signal replica $S(\tau)$, and then making calculations using $$I(\tau)=\max\{S(\tau)\}-S(\tau)$$

The output combination unit 174 combines the thus obtained $S(\tau)$ and $I(\tau)$ in the FFT window section, and thereby estimating the SIR of the received signals after FFT by using the following formula.

$$SIR(\tau) = \sum_{n=0}^{N_{FFT}-1} S(\tau+n) \bigg/ \sum_{n=0}^{N_{FFT}-1} I(\tau+n)$$

The maximum combination power detection unit 175 detects a timing $\tau_{max}$ at which the thus obtained $SIR(\tau)$ is a maximum, and this timing is regarded as the symbol synchronization timing.

Figure 22:
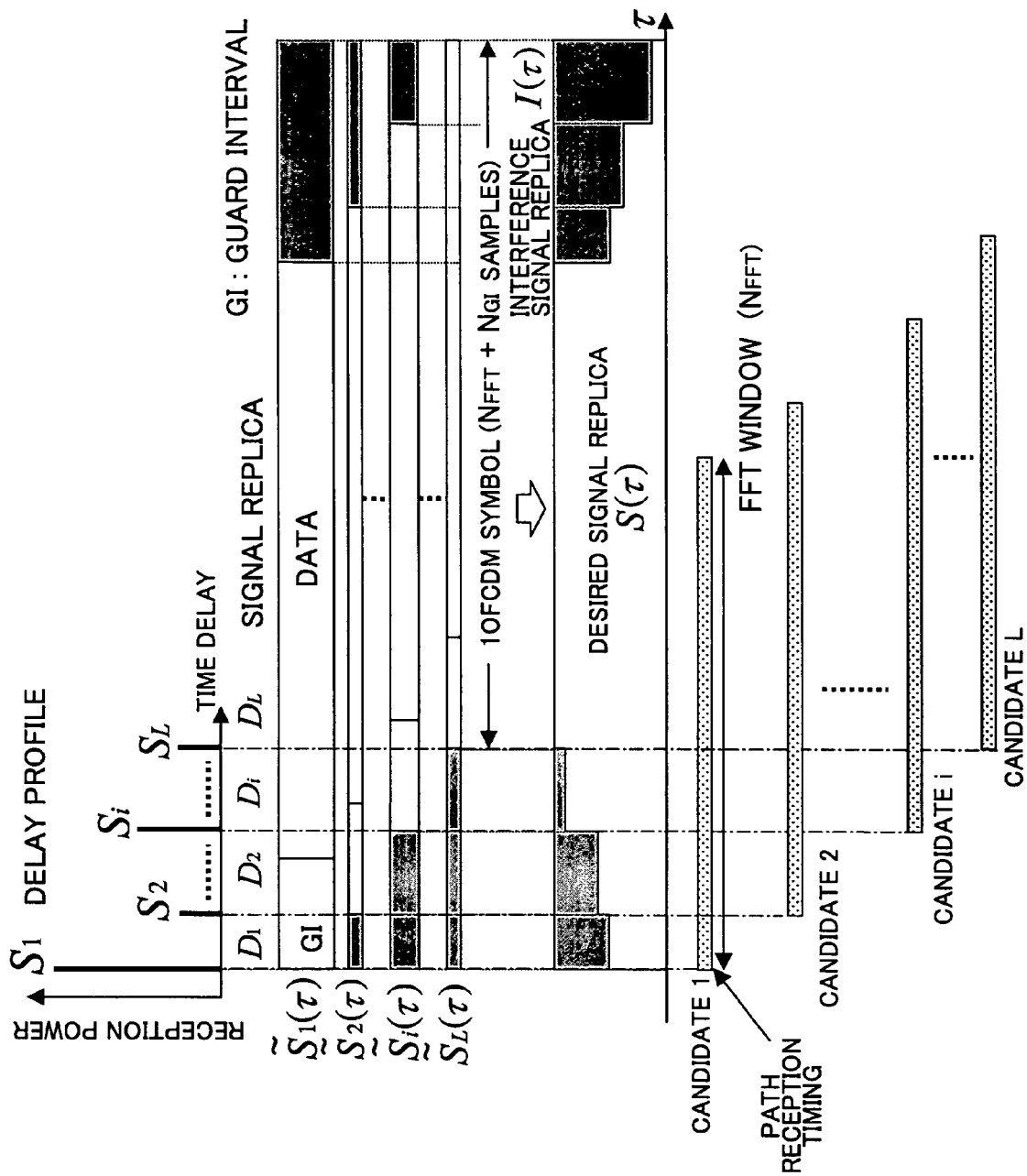
FIG. 22 is a diagram schematically illustrating a second example of the method of detecting the symbol synchronization timing by the symbol synchronization timing detection unit 10 in FIG. 19, according to the embodiment of the present invention.

FIG. 22 is a diagram schematically illustrating a second example of the method of detecting the symbol synchronization timing by the symbol synchronization timing detection unit 10 in FIG. 19, according to the embodiment of the present invention.

In FIG. 22, the same as in FIG. 20, the correlation detection unit 171 calculates correlation values between the reference OFCDM signals and the received OFCDM signals, and generates a delay profile based on the correlations. The delay profile is output to the path detection unit 172, and the path detection unit 172 detects a number of L paths (delay waves). The replica signal generation unit 173 generates the desired signal replica $S(\tau)$ and the interference signal replica $I(\tau)$.

The output combination unit 174 uses reception timings of the delay waves of delay times of $D_1, D_2, \ldots, D_i, \ldots, D_L$ as candidates (candidate 1, candidate 2, ..., candidate i, ..., candidate L) of the symbol synchronization timing, and combines the desired signal replica $S(\tau)$ and the interference signal replica $I(\tau)$ in predetermined sections, for example, FFT window sections related to the timing candidates (candidate 1, candidate 2, ..., candidate i, candidate L), respectively.

The maximum combination power detection unit 175 selects one of the timing candidates (candidate 1, candidate 2, ..., candidate i, candidate L), which results in a maximum of the combined replica signals, and uses the selected timing as the symbol synchronization timing.

Figure 23:
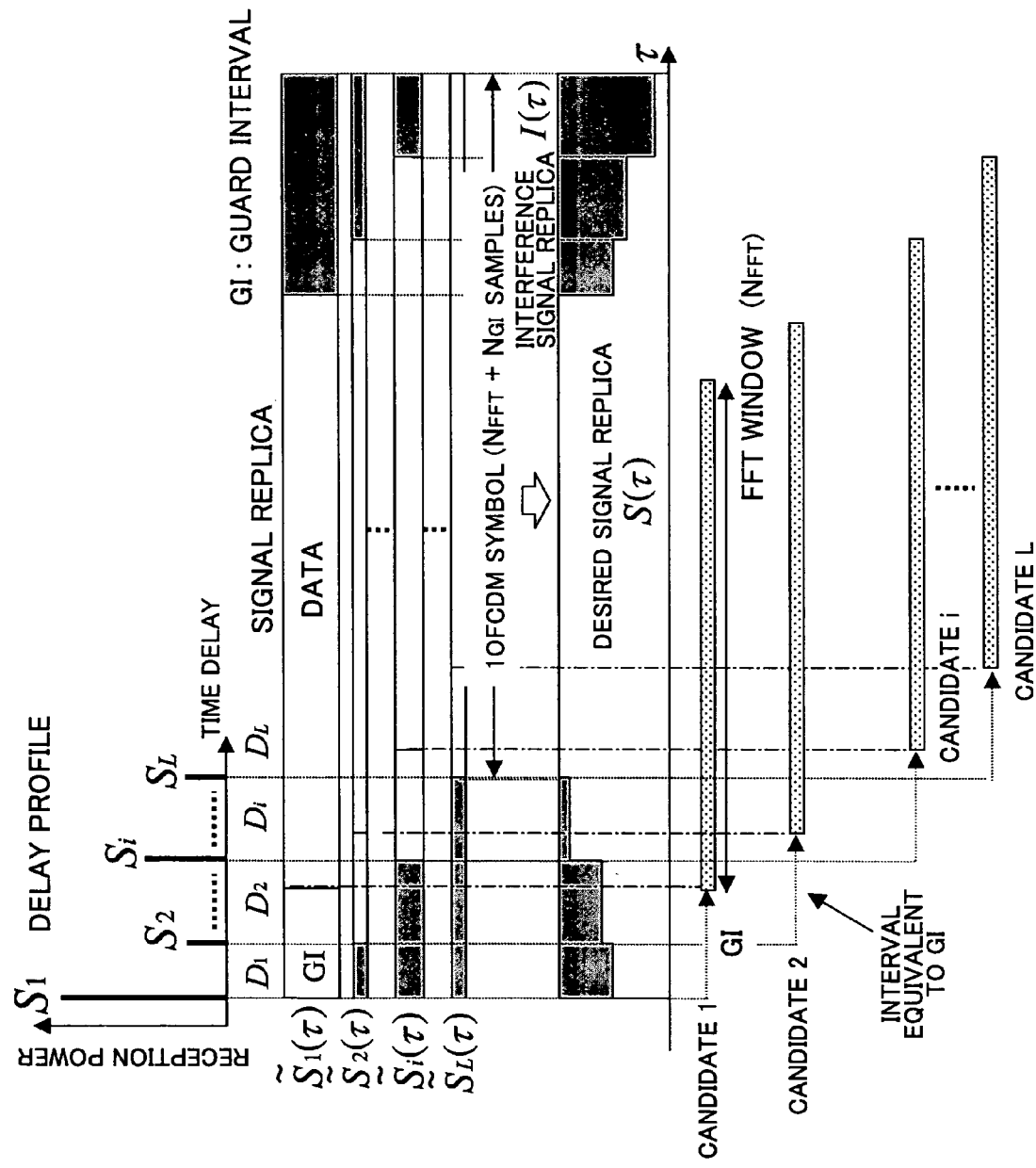
FIG. 23 is a diagram schematically illustrating a third example of the method of detecting the symbol synchronization timing by the symbol synchronization timing detection unit 10 in FIG. 19 according to the embodiment of the present invention.

FIG. 23 is a diagram schematically illustrating a third example of the method of detecting the symbol synchronization timing by the symbol synchronization timing detection unit 10 in FIG. 19, according to the embodiment of the present invention.

In FIG. 23, the same as in FIG. 20 and FIG. 22, the correlation detection unit 171 calculates correlation values between the reference OFCDM signals and the received OFCDM signals, and generates a delay profile based on the correlations. The delay profile is output to the path detection unit 172, and the path detection unit 172 detects a number of L paths (delay waves). The replica signal generation unit 173 generates the desired signal replica $S(\tau)$ and the interference signal replica $I(\tau)$.

The output combination unit 174 shifts the reception timings of the delay waves of delay times of $D_1, D_2, \ldots, D_i, \ldots, D_L$ by a predetermined value, for example, a value equaling the width of the guard interval, and uses the shifted reception timings of the delay waves as candidates (candidate 1, candidate 2, ..., candidate i, ..., candidate L) of the symbol synchronization timing. Then, the output combination unit 174 combines the desired signal replica $S(\tau)$ and the interference signal replica $I(\tau)$ in predetermined sections, for example, FFT window sections related to the timing candidates (candidate 1, candidate 2, ..., candidate i, ..., candidate L), respectively.

The maximum combination power detection unit 175 selects one of the timing candidates (candidate 1, candidate 2, ..., candidate i, ..., candidate L), which results in a maximum of the combined replica signals, and uses the selected timing as the symbol synchronization timing.

Figure 24:
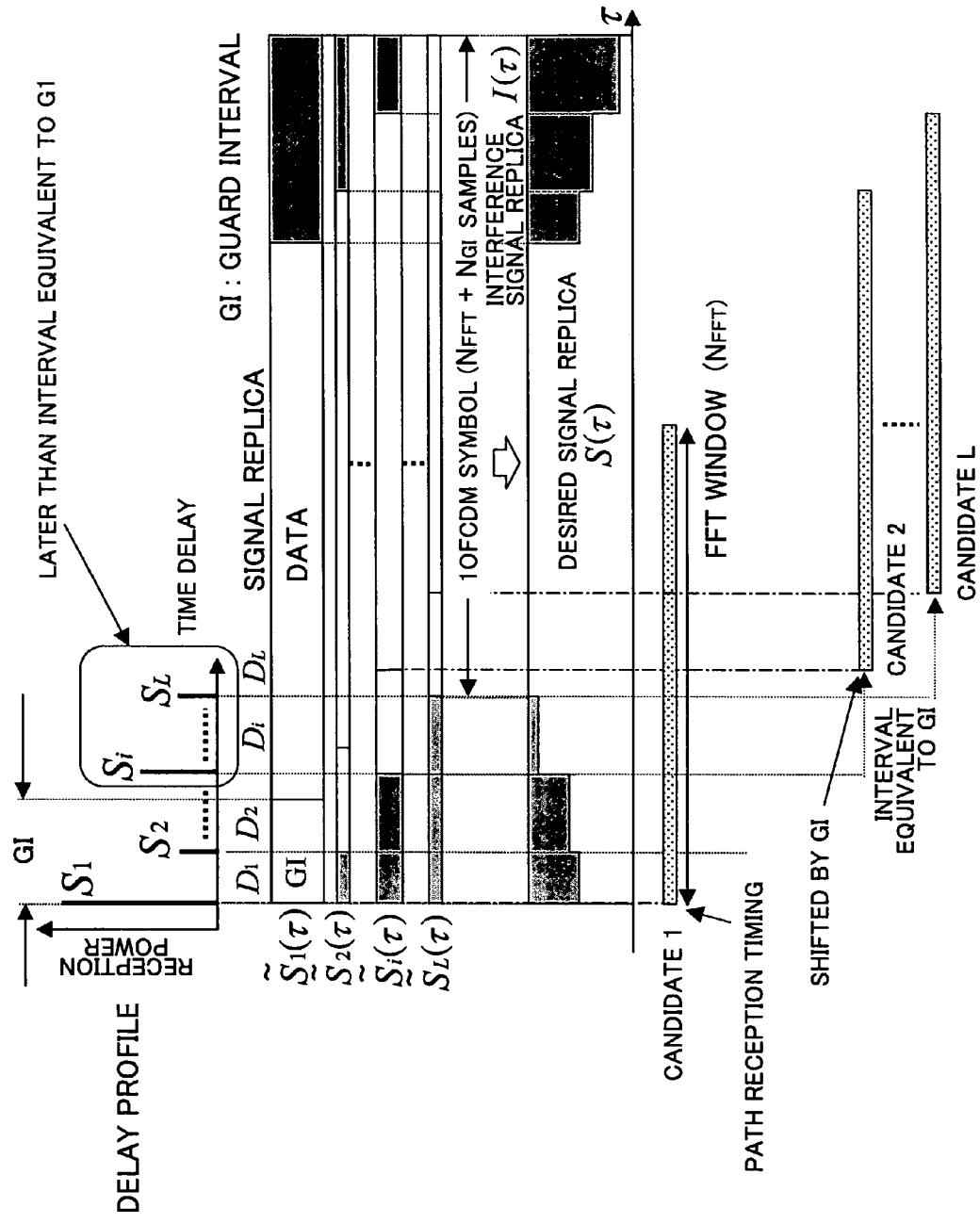
FIG. 24 is a diagram schematically illustrating a fourth example of the method of detecting the symbol synchronization timing by the symbol synchronization timing detection unit 10 in FIG. 19, according to the embodiment of the present invention.
Figure 25A:
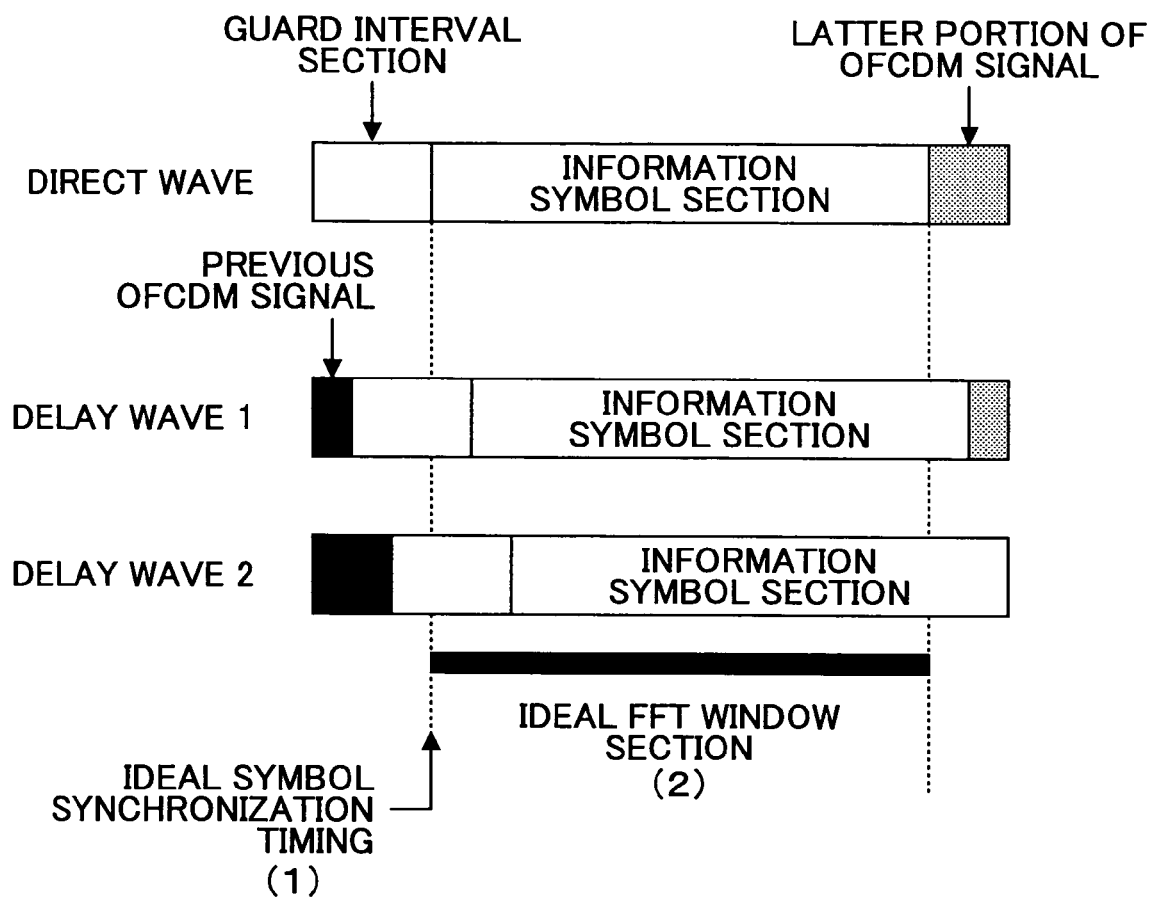
FIGS. 25A and 25B are schematic views exemplifying the symbol synchronization timing.
Figure 25B:
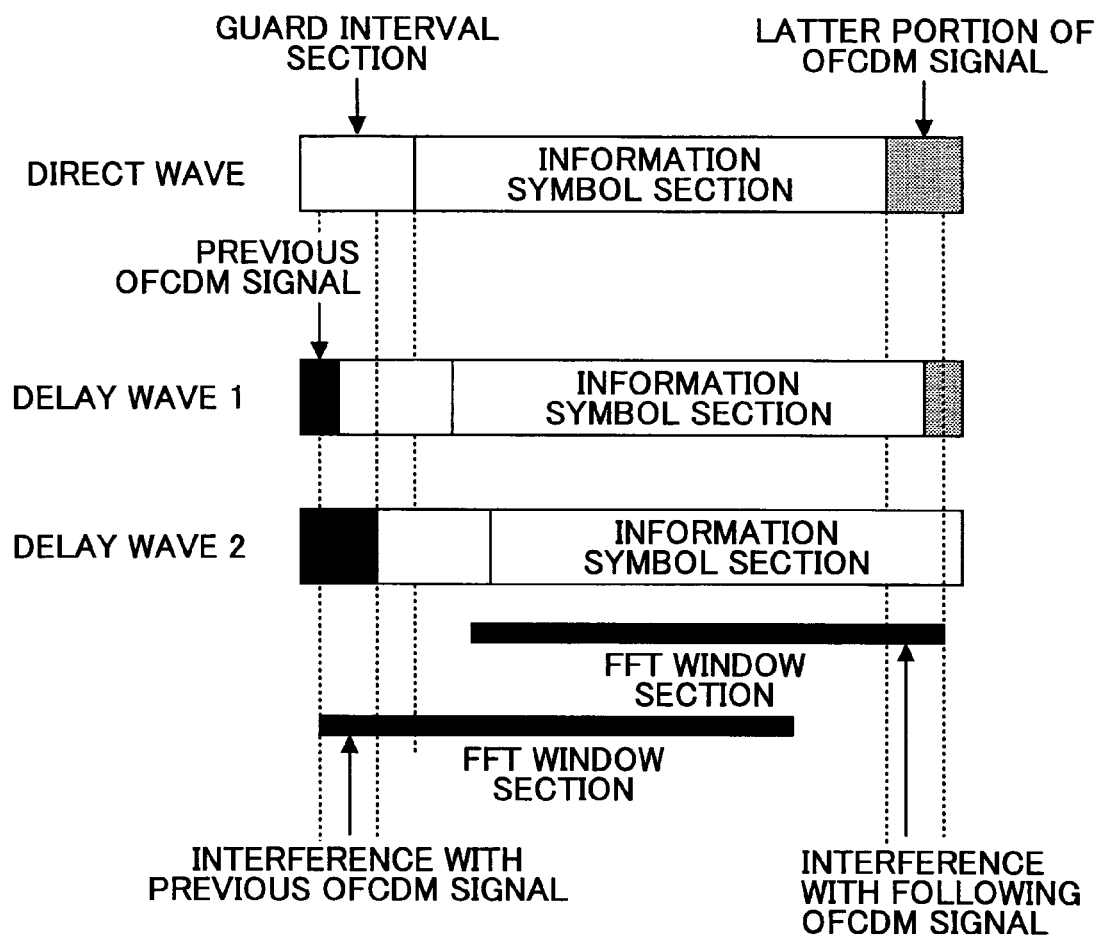

FIG. 24 is a diagram schematically illustrating a fourth example of the method of detecting the symbol synchronization timing by the symbol synchronization timing detection unit 10 in FIG. 19, according to the embodiment of the present invention.

In FIG. 24, the same as in FIG. 23, the correlation detection unit 171 calculates correlation values between the reference OFCDM signals and the received OFCDM signals, and generates a delay profile based on the correlations. The delay profile is output to the path detection unit 172, and the path detection unit 172 detects a number of L paths (delay waves). The replica signal generation unit 173 generates the desired signal replica $S(\tau)$ and the interference signal replica $I(\tau)$.

In the delay profile shown in FIG. 24, delay times $D_i, \ldots, D_L$ are longer than an interval equaling the guard interval relative to the leading path (of a delay time of $D_1$), and delay time $D_2$ is within an interval equaling the guard interval relative to the leading path.

For example, the output combination unit 174 uses the reception timing of the delay wave of the delay time of $D_1$ as a candidate (candidate 1) of the symbol synchronization timing.

In addition, for example, the output combination unit 174 shifts the reception timing, by a predetermined value, for example, a value equaling the width of the guard interval, of any delay wave having a delay time longer than the guard interval, for example, the delay time is $D_l$, and uses the shifted reception timing of the delay wave as a candidate (candidate 2) of the symbol synchronization timing.

For example, the output combination unit 174 may also shift the reception timing, by a predetermined value, for example, a value equaling the width of the guard interval, of the delay wave having a delay time $D_L$, which is longer than the guard interval, and uses the shifted reception timing of the delay wave as a candidate (candidate L) of the symbol synchronization timing.

Then, the output combination unit 174 combines the desired signal replica $S(\tau)$ and the interference signal replica $I(\tau)$ in predetermined sections, for example, FFT window sections related to the timing candidates (candidate 1, candidate 2, ..., candidate L), respectively.

The maximum combination power detection unit 175 selects one of the timing candidates (candidate 1, candidate 2, ..., candidate L), which results in a maximum of the combined replica signals, and uses the selected timing as the symbol synchronization timing.

As described above, according to the present embodiment, in the FFT window section, it is possible to detect the symbol synchronization timing while considering the propagation path conditions, which maintains, as much as possible, electric powers of a direct wave component and a delay wave component of a symbol in the OFCDM signal, while reducing influence of inter-symbol interference. Accordingly, even when the timing of the maximum of the correlation output greatly deviates from the ideal symbol synchronization timing due to the multi-path interference, it is possible to realize high precision symbol synchronization.

While the present invention is described above with reference to specific embodiments chosen for purpose of illustration, it should be apparent that the invention is not limited to these embodiments, but numerous modifications could be made thereto by those skilled in the art without departing from the basic concept and scope of the invention.

For example, in the above embodiments, while it is described using correlation values between known pilot signals as the received signal information, it is certain that the auto-correlation values of the received signals, or the channel estimation values obtained from the received signals can also be used.

In addition, in the above embodiments, an OFCDM signal reception device employing the OFCDM transmission scheme is used as a preferable example. Of course, the present invention is also applicable to a signal reception device using the multi-carrier transmission scheme, in which information symbols are transmitted by a number of sub-carriers having different frequencies.

In addition, in the above embodiments, the timing at which the electric power of the received signal is a maximum is detected, and this timing is used as the symbol synchronization timing. Of course, the electric power of the received signal can be practically measured, or estimated by using propagation path profiles. Further, quality of the received signals or communication quality information, such as BER (bit error rate), can be used as the received signal information, and the symbol synchronization timing can be obtained by measuring the timing at which the quality of the received signal after FFT is the maximum.

This patent application is based on Japanese Priority Patent Application No. 2003-381600 filed on Nov. 11, 2003, the entire contents of which are hereby incorporated by reference.

What is claimed is:

1. A signal reception device adopting an OFCDM (Orthogonal Frequency and Code Division Multiplexing) transmission scheme or a multi-carrier transmission scheme, said signal reception device comprising:
   a received signal information calculation unit configured to calculate received signal information representing a signal reception condition of a received signal;
   a replica signal generation unit configured to generate replica signals of a desired signal and an interference signal, respectively, based on calculation results of the received signal information calculation unit;
   an output combination unit configured to combine correlation values in a predetermined section, said correlation values being obtained by correlation detection based on the received signal information, wherein the output combination unit uses reception timings of a plurality of delay waves in the received signal each shifted by a predetermined value as candidates of a symbol synchronization timing, and combines the replica signals in predetermined sections related to the timing candidates, respectively; and
   a symbol timing detection unit configured to detect the symbol synchronization timing based on the combined correlation value, wherein the symbol timing detection unit selects one of the timing candidates resulting in a maximum of the combined replica signal as the symbol synchronization timing, wherein
   the symbol timing detection unit detects the symbol synchronization timing using the combined replica signals by detecting a timing at which an electric power of the received signal after FFT (Fast Fourier Transform) becomes a maximum.

2. A signal reception device adopting an OFCDM (Orthogonal Frequency and Code Division Multiplexing) transmission scheme or a multi-carrier transmission scheme, said signal reception device comprising:
   a received signal information calculation unit configured to calculate received signal information representing a signal reception condition of a received signal;
   a replica signal generation unit configured to generate replica signals of a desired signal and an interference signal, respectively, based on calculation results of the received signal information calculation unit;
   an output combination unit configured to combine correlation values in a predetermined section, said correlation values being obtained by correlation detection based on the received signal information, wherein the output combination unit uses reception timings and reception timings each shifted by a predetermined value of a plurality of delay waves in the received signal as candidates of a symbol synchronization timing, and combines the replica signals in predetermined sections related to the timing candidates, respectively; and
   a symbol timing detection unit configured to detect the symbol synchronization timing based on the combined correlation value, wherein the symbol timing detection unit selects one of the timing candidates resulting in a maximum of the combined replica signal as the symbol synchronization timing, wherein
   the symbol timing detection unit detects the symbol synchronization timing using the combined replica signals by detecting a timing at which an electric power of the received signal after FFT (Fast Fourier Transform) becomes a maximum.

* * * * *